United States Patent
Lait et al.

(10) Patent No.: US 12,483,586 B1
(45) Date of Patent: Nov. 25, 2025

(54) CONTEXTUAL VULNERABILITY MANAGEMENT

(71) Applicant: Cisco Technology, Inc., San Jose, CA (US)

(72) Inventors: Ryan Nicholas Lait, Camp Hill (AU); Dean Victor Luxton, Redcliffe (AU)

(73) Assignee: Cisco Technology, Inc., San Jose, CA (US)

( * ) Notice: Subject to any disclaimer, the term of this patent is extended or adjusted under 35 U.S.C. 154(b) by 17 days.

(21) Appl. No.: 18/427,603

(22) Filed: Jan. 30, 2024

(51) Int. Cl.
 *H04L 9/40* (2022.01)

(52) U.S. Cl.
 CPC .............................. *H04L 63/1433* (2013.01)

(58) Field of Classification Search
 None
 See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 2019/0098106 A1 | 3/2019 | Mungel et al. | |
| 2022/0131888 A1* | 4/2022 | Kanso | H04L 63/1433 |

OTHER PUBLICATIONS

Splunk Enterprise 8.0.0 Overview, available online, retrieved May 20, 2020 from docs.splunk.com.
Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carasso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

* cited by examiner

*Primary Examiner* — Cai Y Chen
(74) *Attorney, Agent, or Firm* — Kilpatrick Townsend & Stockton LLP

(57) ABSTRACT

Techniques are described for providing a software-based platform for context-based vulnerability management of information technology (IT) environments. In some examples, a vulnerability management application collects vulnerability scan data, from potentially many different scanning agents, as well as vulnerability information from other third-party sources. The vulnerability management application also accesses asset and activity data associated with an IT environment. The vulnerability management application can provide a user interface contextualizing vulnerabilities, based on the contextual asset or activity data, allowing for user-configured or automated vulnerability risk adjustments to impact the management and remediation of vulnerabilities for the IT environment.

20 Claims, 14 Drawing Sheets

CORRELATION SEARCHES 246

─── 402

```
// FIND UNPROCESSED VULNERABILITIES WITH (1) CVSS SCORE > USER THRESHOLD

FIND     VULNERABILITY
FROM     VULNERABILITIES
WHERE    CVSS_BASE_SCORE >= (USER_RISK_THRESHOLD FROM USER_PREFS)
AND      PROCESSED = FALSE
```

─── 404

```
// FIND UNPROCESSED VULNERABILITIES WITH (1) CVSS SCORE > USER THRESHOLD
AND (2) WHERE AN ASSET EXISTS, IN IT ENVIRONMENT, OF AN AFFECTED TYPE

FIND     VULNERABILITY
FROM     VULNERABILITIES
WHERE    CVSS_BASE_SCORE >= (USER_RISK_THRESHOLD FROM USER_PREFS)
AND      EXISTS (FIND ASSET FROM IT_ASSET_DATA
           WHERE ASSET_TYPE IN VULNERABILITY.AFFECTED_TYPE)
AND      PROCESSED = FALSE
```

─── 406

```
// FIND UNPROCESSED VULNERABILITIES WITH (1) CVSS SCORE > USER THRESHOLD
AND (2) WHERE AN ASSET EXISTS, IN IT ENVIRONMENT, OF AN AFFECTED TYPE, AND (3)
WHERE THE ASSET HAS RECENT SUSPICIOUS NETWORK ACTIVITY

FIND     VULNERABILITY
FROM     VULNERABILITIES
WHERE    CVSS_BASE_SCORE >= (USER_RISK_THRESHOLD FROM USER_PREFS)
AND      EXISTS (FIND ASSET FROM IT_ASSET_DATA AS $ASSET
           WHERE ASSET_TYPE IN VULNERABILITY.AFFECTED_TYPE)
AND      EXISTS (FIND ASSET FROM ACTIVITY_DATA
           WHERE ASSET.ID = $ASSET
           AND  (RECENT_PORT_SCAN() = TRUE
           OR   RECENT_MAX_LOGINS() = TRUE
           OR   RECENT_SUSPICIOUS_INBOUND_TRAFFIC() = TRUE
           OR   RECENT_SUSPICIOUS_OUTBOUND_TRAFFIC() = TRUE))
AND      PROCESSED = FALSE
```

─── 410

```
// FIND UNPROCESSED VULNERABILITIES WITH (1) A VULNERABILITY TYPE OF
"REMOTE CODE EXECUTION" AND (2) WHERE AN ASSET EXISTS THAT IS
VULNERABLE TO THE VULNERABILITY

FIND     VULNERABILITY
FROM     VULNERABILITIES
WHERE    TYPE = "REMOTE CODE EXECUTION"
AND      EXISTS (FIND ASSET FROM IT_ASSET_DATA
           WHERE ASSET_TYPE IN VULNERABILITY.AFFECTED_TYPE)
AND      PROCESSED = FALSE
```

─── 412

```
// FIND UNPROCESSED VULNERABILITIES WITH (1) A VULNERABILITY TYPE OF
"REMOTE CODE EXECUTION" AND (2) WHERE AN ASSET EXISTS THAT IS
VULNERABLE TO THE VULNERABILITY, AND (3) WHERE THAT ASSET IS PUBLIC-
FACING

FIND     VULNERABILITY
FROM     VULNERABILITIES
WHERE    TYPE = "REMOTE CODE EXECUTION"
AND      EXISTS (FIND ASSET IN IT_ASSET_DATA
           WHERE PUBLIC_FACING = TRUE
           AND   ASSET_TYPE IN VULNERABILITY.AFFECTED_TYPE)
AND      PROCESSED = FALSE
```

FIG. 4

Vulnerability Management Service

Vulnerability Management Console    Critical Asset Center    CVE Finder    Vulnerability Workbench    App ▼

Current Page: 1    ← Prev    | 1 |  2    Next →

| CVE ID | Status | Base / Adjusted CVSS | Severity | Category | Assets Total | Assets Critical | Anomalous Asset Activity | Description |
|---|---|---|---|---|---|---|---|---|
| CVE-2023-32233 | Assigned for Remediation | 7.8 / 8.4 | High | Use After Free | 677 | 49 | PORT SCANS<br>NEW LOGINS<br>EGRESS TRAFFIC | In the Linux kernel through 6.3.1, a use-nf_tables when processing batch requests perform arbitrary read and write operations Unprivileged local users can obtain root because anonymous sets are mishandled |
| CVE-2023-31436 | Assigned for Remediation | 7.8 / 6.3 | High | Buffer Overflow | 40 | 12 | | qfq_change_class in net/sched/sch_qfq.c before 6.2.13 allows an out-of-bounds exceed QFQ_MIN_LMAX. |
| CVE-2023-31047 | New | 9.8 / ___ | Critical | OWASP TOP 10; Injection | 112 | 6 | TRAFFIC VOLUME | In Django 3.2 before 3.2.19, 4.x before 4.2.1, it was possible to bypass validation form field to upload multiple files. This never been supported by forms.FileField (only the last uploaded file was validated). "Uploading multiple files" documentation |
| N/A | New | 7.3 / ___ | High | Encryption | ? | ? | | Manually entered -- we suspect that our cu system may not sufficiently obfuscate the so we may need to see if the cipher suite l Also, the encryption protocol itself might n so that should be checked as well. |

VULNERABILITY WORKBENCH INTERFACE 700

VULNERABILITY RECORDS 702A-702X

FIG. 7

Vulnerability Management Service

Vulnerability

Current Pa...

| CVE ID |
|---|
| CVE-2023- |
| CVE-2023- |
| CVE-2023- |
| CVE-2023- |

CVE ID: CVE-2023-22745 (view)
STATUS: Assigned for Remediation
TYPE: TPM Buffer Overrun
SEVERITY: Medium

CVE STATUS: Modified

Base Score: 6.4
Temporal Score: ---
Environmental Score: 4.6

Total Adjusted Score: 5.1

( UPDATE )

Temporal Overrides
Exploit Code Maturity

| Not Defined | Unproven | Proof-of-Concept | Functional | High |

Remediation Level

| Not Defined | Official Fix | Temporary Fix | Workaround | Unavailable |

Report Confidence

| Not Defined | Unknown | Reasonable | Confirmed |

Environmental Requirement Overrides
Confidentiality Requirement

| Not Defined | High | Medium | Low |

Integrity Requirement

| Not Defined | High | Medium | Low |

Availability Requirement

| Not Defined | High | Medium | Low |

Environmental Modified Exploitability Overrides
Modified Attack Vector

| Not Defined | Network | Adjacent | Local | Physical |

Modified Attack Complexity

| Not Defined | Low | High |

Modified Privileges Required

| Not Defined | None | Low | High |

VULNERABILITY SCORE ADJUSTMENT INTERFACE 900

FIG. 9

Vulnerability Management Service

Vulnerability Management Console    Critical Asset Center    CVE Finder    Vulnerability Workbench    App ▼

CVE

UI INPUT ELEMENT 1020

[ CVE-2023-23397 ] ( SEARCH )

---

CVE-2023-23397 — Microsoft Outlook Elevation of Privilege Vulnerability     ( ADD TO WORKBENCH )

Published 2023-03-14

UI INPUT ELEMENT 1024

CVSS Severity

⚠

9.8 Critical 0   2   4   6   8   10

Exploitability
Attack Vector: NETWORK
Attack Complexity: HIGH
Privileges Required: NONE
User Interaction: NONE Scope: UNCHANGED

IMPACT
Confidentiality: HIGH
Integrity: HIGH
Availability: HIGH

Description

CVE-2023-23397 is a critical privilege escalation/ authentication bypass vulnerability in Outlook, released as part of the March Patch Tuesday set of fixes. CVE-2023-23397 is an elevation of privilege (EoP) vulnerability in Microsoft Outlook. It is a zero-touch exploit, meaning the security gap requires...

| CVE Age: 204 Days | Category: Application | Vendor: Microsoft |
| CISA KEV: Yes | Trending CVE: No | Solution Type: Patch |

Solution

Apply the vendor patches immediately. Microsoft has released a patch as part of their March 2023 Monthly Security Update.

▶

Vulnerable Assets

[ 42 AFFECTED ASSETS (22 CRITICAL) – CLICK TO VIEW ]

AFFECTED ASSET PANEL 1010

VULNERABILITY EXPLORATION INTERFACE 1000

FIG. 10

1100 

```
OBTAIN, BY AN ENTERPRISE SECURITY APPLICATION, A VULNERABILITY REPORT
GENERATED BY A VULNERABILITY SCANNER, WHEREIN THE VULNERABILITY REPORT IS
INDICATIVE OF A DETECTED VULNERABILITY ASSOCIATED WITH A COMPUTING RESOURCE
UTILIZED WITHIN AN INFORMATION TECHNOLOGY (IT) ENVIRONMENT
1102
```

```
IDENTIFY, BY THE ENTERPRISE SECURITY APPLICATION VIA A SECURITY INFORMATION
AND EVENT MANAGEMENT (SIEM) DATA STORE, ONE OR MORE OF ASSET DATA OR
ACTIVITY DATA OF THE IT ENVIRONMENT ASSOCIATED WITH THE COMPUTING RESOURCE
1104
```

```
CAUSE DISPLAY, BY THE ENTERPRISE SECURITY APPLICATION, OF A GRAPHICAL USER
INTERFACE (GUI) INDICATIVE OF THE VULNERABILITY AND IDENTIFYING THE ASSET DATA
OR ACTIVITY DATA
1106
```

```
MODIFY A RISK SCORE ASSOCIATED WITH THE VULNERABILITY
1108
```

FIG. 11

CONTEXTUAL VULNERABILITY MANAGEMENT

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

In the field of computing, vulnerabilities are any sort of defect that weakens systems such as those that support businesses, enterprises, governments, and other organizations. These defects might be in software, hardware, or even the people making up those organizations. Unauthorized personnel or attackers can exploit these vulnerabilities to gain access to sensitive data.

There are many types of vulnerabilities, such as unpatched software, unsecured Application Programming Interfaces (APIs), the use of weak credentials, programming bugs, system misconfigurations, uploads of dangerous files, Uniform Resource Location (URL) redirection to unsecured websites, and the like. Many vulnerabilities are tracked as CVEs, or Common Vulnerabilities and Exposures, which provide a global, reliable, and timely list of common vulnerabilities and exposures.

BRIEF DESCRIPTION OF THE DRAWINGS

Illustrative examples are described in detail below with reference to the following figures:

FIG. 4 illustrates an example set of correlation searches utilized to identify notable vulnerabilities according to some examples.

FIG. 7 illustrates an example graphical user interface providing a vulnerability workbench displaying IT environment-specific contextual vulnerability information according to some examples.

FIG. 9 illustrates an example graphical user interface providing a vulnerability score adjustment interface with a downward user-configurable vulnerability override according to some examples.

FIG. 10 illustrates an example graphical user interface providing Common Vulnerabilities and Exposure (CVE) information according to some examples.

FIG. 11 is a flowchart illustrating operations of an example process for contextual vulnerability management according to some examples.

DETAILED DESCRIPTION

Figure 1:
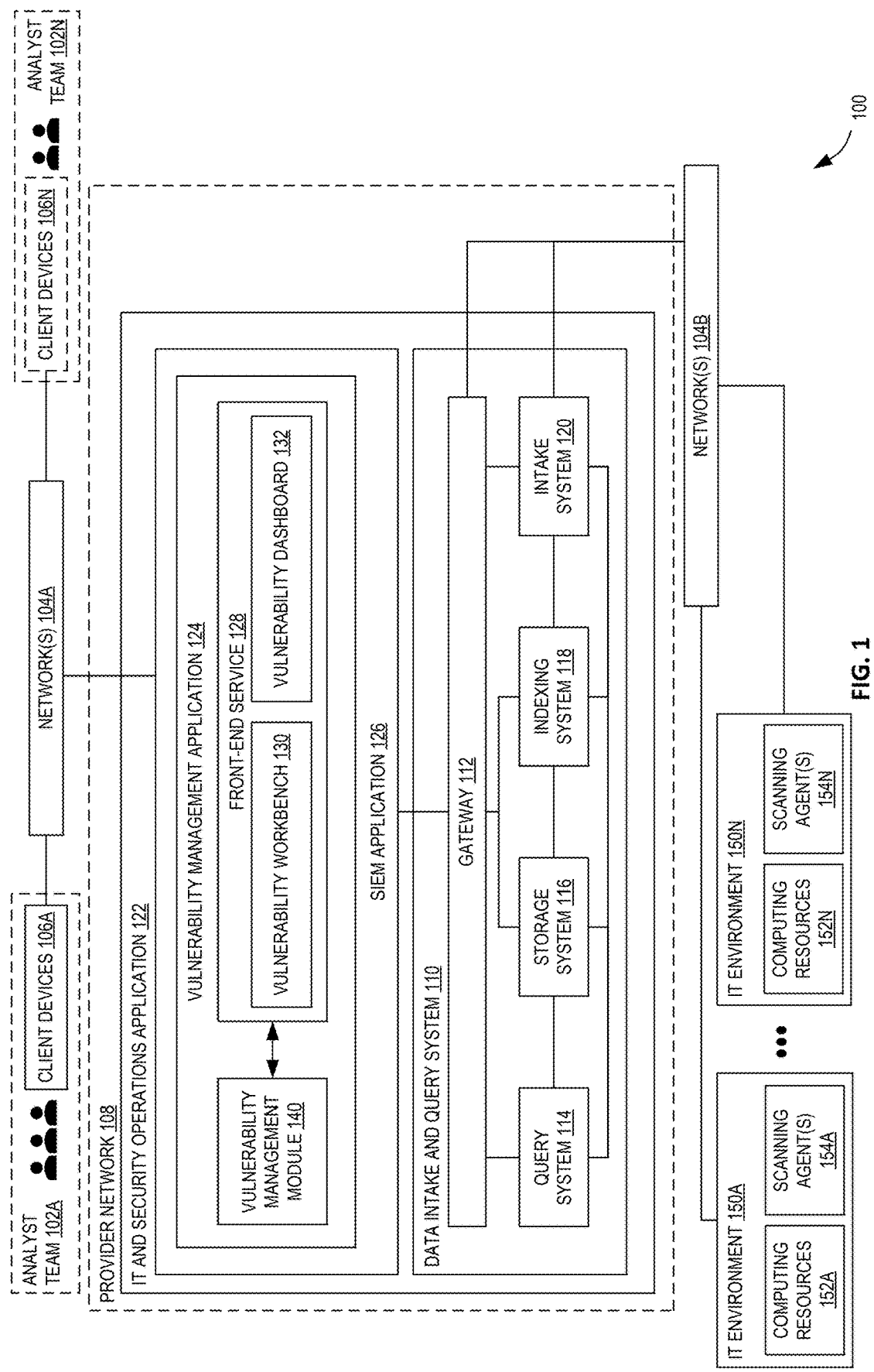
FIG. 1 is a diagram of an example computing environment in which a vulnerability management application is utilized by analyst teams to perform contextual vulnerability management for information technology (IT) environments according to some examples.

Vulnerability management is an ongoing practice that helps organizations identify, assess, prioritize and fix vulnerabilities in their systems. Ultimately, the goal of vulnerability management is to reduce the risks posed by vulnerabilities by using techniques such as patching, hardening, and configuration management. This helps to ensure security while limiting risks that could potentially be exploited by malicious users.

Patching and reconfiguring systems within an organization's Information Technology (IT) environment is only a small part of vulnerability management. In fact, vulnerability management is an ongoing practice that requires discipline and understanding of new threats that emerge every day together with visibility into what computing software and hardware assets are in use and how those change over time. This continuous process typically has three major phases: identification (to identify vulnerabilities affecting organizational assets across an IT environment), assessment (to determine how detected vulnerabilities affect the IT environment), and remediation (to address the vulnerabilities, such as by performing software patching or reconfiguration).

Given the continually changing nature of organizational computing environments, such as near-constant changing numbers and configurations of computing systems being used and the changing nature of network activity in these environments, as well as the continual development and discovery of new vulnerabilities, vulnerability management remains an incredibly challenging process, especially when combined with the typically limited amounts of resources or systems available to aid in remediation.

The present disclosure relates to methods, apparatus, systems, and non-transitory computer-readable storage media for contextual vulnerability management. In some examples, a vulnerability management application is provided that obtains vulnerability scan result data involving computing resources in an Information Technology (IT) environment and contextualizes this vulnerability data using asset data and/or activity data, from the IT environment, associated with the computing resources. In some examples, the vulnerability management application provides the contextual vulnerability data via one or more graphical user interfaces (GUIs), which can include interfaces allowing for user-modification of associated vulnerability scores based on contextual information, such as asset-specific information, environment-specific information, network configuration or activity information, temporal information, and the like, allowing vulnerabilities to be contextualized in that their impact, or lack thereof, within an environment can be determined. Moreover, in some examples, the vulnerability management application itself can modify vulnerability scores based on this contextual information. In some examples, the vulnerability management application further includes dashboards and other interfaces that enable users to analyze the existence and severity of vulnerabilities from a broad IT environmental perspective as well as to drill-down to explore and manage vulnerabilities on a resource-specific level, among other benefits. As a result, users of these systems can benefit from a unified system allowing users to easily focus on "important" or "critical" vulnerabilities to be addressed (as determined based on the IT environment's context) instead of being overwhelmed with near-limitless numbers of inbound vulnerabilities.

FIG. 1 is a diagram of an example computing environment 100 in which a vulnerability management application is utilized by analyst teams to perform vulnerability management for IT environments according to some examples. As shown, a vulnerability management application 124 is illustrated that may interoperate with a SIEM application 126 and/or a data intake and query system 110 to implement contextual vulnerability management for IT environments. Some or all of these components—the vulnerability management application 124, the SIEM application 126, and the data intake and query system 110—can be part of an IT and security operations application 122 that can be implemented as software executed by one or multiple computing devices at one or multiple locations. For example, some or all of these IT and security operations application 122 components may be implemented within a provider network 108 and its functionality utilized by other users (e.g., via client devices 106A or 106N) across one or more networks 104A.

Entities of various types, such as companies, educational institutions, medical facilities, governmental departments, and private individuals, among other examples, operate computing environments for various purposes. Computing environments, which can also be referred to as IT environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both of these examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

The IT and security operations application 122, IT environments 150A-150N, and client devices 106 can communicate with each other via one or more networks 104, such as a local area network (LAN), wide area network (WAN), private or personal network, cellular networks, etc., using any of wired, wireless, terrestrial microwave, satellite links, etc., and may include the Internet. Thus, it is to be understood that a client computing device 106 can communicate with a host device (one of computing resources 152A-152N) via one or more networks 104A-104B. For example, if a host device of the computing resources 152A in a first IT environment 150A (e.g., a data center, a colocation space, a cloud network, an office building, a collection of multiple locations, etc.) is configured as a web server and a client computing device 106 is a laptop, the laptop can communicate with the web server to view a website.

Generally, a client device 106 can correspond to a distinct computing device that can configure, manage, or sends queries to the IT and security operations application 122. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 can include a hosted, virtualized, or containerized device, such as an isolated execution environment, that shares computing resources (e.g., processor, memory, etc.) of a particular machine with other isolated execution environments.

The client devices 106 can interact with the IT and security operations application 122 (or a computing resource 152) in a variety of ways. For example, client devices 106 can communicate with the IT and security operations application 122 (or a computing resource 152) over an Internet (Web) protocol, via a gateway, via a command line interface, via a software developer kit (SDK), a standalone application, etc. As another example, client devices 106 can use one or more executable applications or programs to interface with the IT and security operations application 122.

A computing resource 152 such as a host device can correspond to a distinct computing device or system that includes or has access to data that can be ingested, indexed, and/or searched by the data intake and query system 110. Accordingly, in some cases, a client device 106 may also be a computing resource (e.g., it can include data that is ingested by the data intake and query system 110 and it can submit queries to the system 110). Examples of computing resources 152 can include, but are not limited to, servers, sensors, routers, personal computers, mobile devices, internet of things (IoT) devices, or hosting devices, such as computing devices in a shared computing resource environment on which multiple isolated execution environment (e.g., virtual machines, containers, etc.) can be instantiated, or other computing devices in an IT environment (e.g., device that includes computer hardware, e.g., processors, non-transitory, computer-readable media, etc.). In certain cases, a computing resource 152 can include a hosted, virtualized, or containerized device, such as an isolated execution environment, that shares computing resources (e.g., processor, memory, etc.) of a particular machine (e.g., a hosting device or hosting machine) with other isolated execution environments.

As mentioned, computing resources 152 can include or have access to data sources for the data intake and query system 110. The data sources can include machine data found in log files, data files, distributed file systems, streaming data, publication-subscribe (pub/sub) buffers, directories of files, data sent over a network, event logs, registries, streaming data services (examples of which can include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device of computing resources 152 may generate various types of machine data during operation. For example, a web server application may generate one or more web server logs detailing interactions between the web server and any number of client devices 106 or other devices. As another example, a router may generate one or more router logs that record information related to network traffic managed by the router. As yet another example, a database server application may generate one or more logs that record information related to requests sent from other devices (e.g., web servers, application servers, client devices, etc.) for data managed by the database server. Similarly, a computing resource 152 may generate and/or store computing resource utilization metrics, such as, but not limited to, CPU utilization, memory utilization, number of processes being executed, etc. Any one or any combination of the files or data generated in such cases can be used as a data source for the data intake and query system 110.

In some embodiments, an IT environment 150A-150N may include a non-illustrated monitoring component that facilitates generating performance data related to a host device's operating state, including monitoring network traffic sent and received from the host device, and collecting other device and/or application-specific information. A monitoring component may be implemented as software as an integrated component of an application, a plug-in, an extension, or any other type of add-on component, or a stand-alone process.

Such monitored information may include, but is not limited to, network performance data (e.g., a URL requested, a connection type (e.g., HyperText Transfer Protocol (HTTP), HTTPS, etc.), a connection start time, a connection end time, an HTTP status code, request length, response length, request headers, response headers, connection status (e.g., completion, response time(s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component can collect device performance information by monitoring one or more host device operations, or by making calls to an operating system and/or one or more other applications executing on a host device for performance information. The monitored information may be stored in one or more files and/or streamed to the data intake and query system 110.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

In some embodiments, such as in a shared computing resource IT environment 150 (or hosted environment), a computing resource 152 (e.g., a host device) may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device), and/or machine data generated by monitoring the computing resources of the host device (e.g., CPU utilization, memory utilization, etc.) that are shared between the isolated execution environments.

Given the separation (and isolation) between isolated execution environments executing on a common computing device, in certain embodiments, each isolated execution environment may be treated as a separate host device even if they are, in fact, executing on the same computing device or hosting device.

Accordingly, as used herein, obtaining data from a data source may refer to communicating with a host device (computing resource) to obtain data from the host device (e.g., from one or more data source files, data streams, directories on the host device, etc.). For example, obtaining data from a data source may refer to requesting data from a host device and/or receiving data from a host device. In some such cases, the host device can retrieve and return the requested data from a particular data source and/or the data intake and query system 110 can retrieve the data from a particular data source of the host device (e.g., from a particular file stored on a host device).

The data intake and query system 110, in some examples, can ingest, index, and/or store data from heterogeneous data sources and/or computing resources 152. For example, the data intake and query system 110 can be adapted to ingest, index, and/or store any type of machine data, regardless of the form of the machine data or whether the machine data matches or is similar to other machine data ingested, indexed, and/or stored by the data intake and query system 110. In some cases, the data intake and query system 110 can generate events from the received data, group the events, and store the events in buckets (e.g., a data structure such as a folder, directory, label, or the like). The data intake and query system 110 can also search heterogeneous data that it has stored or search data stored by other systems (e.g., data of the SIEM application 126, vulnerability management application 124, or other system). For example, in response to received queries, the data intake and query system 110 can assign one or more components to search events stored in the storage system or search data stored elsewhere.

As will be described herein in greater detail below, the data intake and query system 110 can use one or more components to ingest, index, store, and/or search data. In some embodiments, the data intake and query system 110 is implemented as a distributed system that uses multiple components to perform its various functions. For example, the data intake and query system 110 can include any one or any combination of an intake system 120 (including one or more components) to ingest data, an indexing system 118 (including one or more components) to index the data, a storage system 116 (including one or more components) to store the data, and/or a query system 114 (including one or more components) to search the data, etc.

In the illustrated embodiment, the data intake and query system 110 is shown having subsystems 114, 116, 118, 120, as well as a gateway 112 (e.g., providing an interface allowing interaction with external devices or to facilitate communications between components of the system 110). However, it will be understood that the data intake and query system 110 may include any one or any combination of these components. Further, in certain embodiments, one or more of the intake system 120, indexing system 118, query system 114, or storage system 116 may be used alone or apart from the data intake and query system 110. For example, the intake system 120 may be used alone to glean information from streaming data that is not indexed or stored by the data intake and query system 110, or the query system 114 may be used to search data that is unaffiliated with the data intake and query system 110.

In certain embodiments, the components of the different systems may be distinct from each other or there may be some overlap. For example, one component of the data intake and query system 110 may include some indexing functionality and some searching functionality and thus be used as part of the indexing system 118 and query system 114, while another computing device of the data intake and query system 110 may only have ingesting or search functionality and only be used as part of those respective systems. Similarly, the components of the storage system 116 may include data stores of individual components of the indexing system and/or may be a separate shared data storage system, such as a cloud-based object storage service such as the Amazon Simple Storage Service (S3)™ service, that is accessible to distinct components of the intake system 120, indexing system 118, and/or query system 114.

In some cases, the components of the data intake and query system 110 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 120, indexing system 118, storage system 116, and query system 114 can refer to those components used for ingesting, indexing, storing, and searching, respectively. However, it will be understood that although reference is made to various separate systems, the same underlying component may be performing the functions for the various different systems. For example, reference to the indexing system 118 indexing data and storing the data in the storage system 116 or the query system 114 searching the data may refer to the same component (e.g., same computing device or hosted device) indexing the data, storing the data, and then searching the data that it stored.

As will be described in greater detail herein, the intake system 120 can receive data from IT environments 150A-150N (e.g., computing resources 152 such as host devices or other data sources), perform one or more preliminary processing operations on the data, and communicate the data to the indexing system 118, query system 114, storage system 116, or to other systems (which may include, for example, data processing systems, telemetry systems, real-time analytics systems, data stores, databases, etc., any of which may be operated by an operator of the data intake and query system 110 or a third party). Given the amount of data that can be ingested by the intake system 120, in some examples, the intake system can include multiple distributed computing devices or components working concurrently to ingest the data.

The intake system 120 can receive data from the IT environments 152 in a variety of formats or structures. In some examples, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 120 can include, but is not limited to, associating metadata with the data received from a host device, extracting a timestamp from the data, identifying individual events within the data, extracting a subset of machine data for transmittal to the indexing system 118, enriching the data, etc. As part of communicating the data to the indexing system 118, the intake system 120 can route the data to a particular component of the intake system 120 or dynamically route the data based on load-balancing, etc. In certain cases, one or more components of the intake system 120 can be installed within an IT environment 150, such as on a host device itself.

As will be described in greater detail herein, the indexing system 118 can include one or more components (e.g., indexing nodes implemented by one or more computing devices, where one or more nodes can be implemented by any particular computing device) to process the data and store it, for example, in the storage system 116. As part of processing the data, the indexing system 118 can identify distinct events within the data, timestamps associated with the data, organize the data into buckets (e.g., a collection of data elements) or time series buckets (e.g., a collection of data elements having associated timestamps within some time range), convert editable buckets to non-editable buckets, store copies of the buckets in the storage system 116, merge buckets, generate indexes of the data, etc. In addition, the indexing system 118 can update various catalogs or databases with information related to the buckets (pre-merged or merged) or data that is stored in the storage system 116 and can communicate with the intake system 120 about the status of the data storage.

The query system 114, in some examples, includes one or more components to receive, process, and execute queries. In some cases, the query system 114 can use a same component to process and execute the query or can use one or more components to receive and process the query (e.g., a search head) and then one or more other components to execute at least a portion of the query (e.g., search nodes). In some cases, a search node and an indexing node may be implemented by the same computing device or hosted device performing different functions. In certain cases, a search node can be a separate computing device or hosted device from that implementing an indexing node.

Queries received by the query system 114 (e.g., from ones of the client devices 106A-106N or another query source) can be relatively complex and identify a set of data to be processed and a manner of processing the set of data. In some cases, the query can be implemented using a pipelined command language or other query language (e.g. a SQL type query language). As described herein, in some cases, the query system 114 can execute parts of the query in a distributed fashion (e.g., one or more mapping phases or parts associated with identifying and gathering the set of data identified in the query) and execute other parts of the query on a single component (e.g., one or more reduction phases). However, it is to be understood that in some cases multiple components can be used in the map and/or reduce functions of the query execution.

In some cases, as part of executing the query, the query system 114 can use one or more catalogs or databases to identify the set of data to be processed or its location in the storage system 116 and/or can retrieve data from the storage system 116. In addition, in some embodiments, the query system 114 can store some or all of the query results in the storage system 116.

In some cases, the storage system 116 may include one or more data stores associated with or coupled to the components of the indexing system 118 that are accessible via a system bus or local area network. In certain embodiments, the storage system 116 may be a shared storage system 116, such as that provided by a cloud-based object storage service like Amazon S3™ or Google Cloud Storage™, which are accessible via a wide area network.

The storage system 116, in some examples, includes one or more data stores storing data that has been processed by the indexing system 118. The storage system 116 includes data stores of the components of the indexing system 118 and/or query system 114. In some examples, the storage system 116 can be implemented as a shared storage system configured to provide high availability, highly resilient, low loss data storage. In some examples, to provide high availability, highly resilient, low loss data storage, the shared storage system 116 can store multiple copies of the data in different geographic locations, potentially across different types of data stores (e.g., solid state, hard drive, tape, etc.). Further, as data is received at the shared storage system 116 it can be automatically replicated multiple times according to a replication factor to different data stores across the same and/or different geographic locations. In some embodiments, the shared storage system 116 can correspond to cloud storage, such as Amazon S3™ or Elastic Block Storage (EBS)™, Google Cloud Storage™, Microsoft Azure Storage™, etc.

In some embodiments, the indexing system 118 can read to and write from the storage system 116. For example, the indexing system 118 can copy buckets of data from its local or shared data stores to the storage system 116. In certain embodiments, the query system 114 can read from, but cannot write to, the storage system 116. For example, the query system 114 can read the buckets of data stored in shared storage system 116 by the indexing system 118 but may not be able to copy buckets or other data to the shared storage system 116. In some examples, the intake system 120 does not have direct access to the storage system 116. However, in some examples, one or more components of the intake system 120 can write data to the shared storage system 116 that can be read by the indexing system 118.

As described herein, in some embodiments, data in the data intake and query system 110 (e.g., in the data stores of the components of the indexing system 118, storage system 116, or search nodes of the query system 114) can be stored in one or more time series buckets. Each bucket can include raw machine data that is associated with a timestamp (e.g., within a range of timestamps, or having a particular timestamp) and additional information about the data or bucket, such as, but not limited to, one or more filters, indexes (e.g., a time-series index or "TSIDX", inverted indexes, keyword indexes, etc.), bucket summaries, etc. In some examples, the bucket data and information about the bucket data is stored in one or more files. For example, the raw machine data, filters, indexes, bucket summaries, etc. can be stored in respective files in or associated with a bucket. In certain cases, the group of files can be associated together to form the bucket.

The data intake and query system 110 can include additional components that interact with any one or any combination of the intake system 120, indexing system 118, query system 114, and/or storage system 116. Such components may include, but are not limited to an authentication system, orchestration system, one or more catalogs or databases, a gateway 112, etc.

An authentication system can include one or more components to authenticate users to access, use, and/or configure the data intake and query system 110. Similarly, the authentication system can be used to restrict what a particular user can do on the data intake and query system 110 and/or what components or data a user can access, etc.

An orchestration system can include one or more components to manage and/or monitor the various components of the data intake and query system 110. In some embodiments, the orchestration system can monitor the components of the data intake and query system 110 to detect when one or more components has failed or is unavailable and enable the data intake and query system 110 to recover from the failure (e.g., by adding additional components, fixing the failed component, or having other components complete the tasks assigned to the failed component). In certain cases, the orchestration system can determine when to add components to or remove components from a particular sub-system 112, 114, 116, 118, 120 (e.g., based on usage, user/tenant requests, etc.). In examples where the data intake and query system 110 is implemented in a shared computing resource environment, the orchestration system can facilitate the creation and/or destruction of isolated execution environments or instances of the components of the data intake and query system 110, etc.

In certain embodiments, the data intake and query system 110 can include various components that enable it to provide stateless services or enable it to recover from an unavailable or unresponsive component without data loss in a time efficient manner. For example, the data intake and query system 110 can store contextual information about its various components in a distributed way such that if one of the components becomes unresponsive or unavailable, the data intake and query system 110 can replace the unavailable component with a different component and provide the replacement component with the contextual information. In this way, the data intake and query system 110 can quickly recover from an unresponsive or unavailable component while reducing or eliminating the loss of data that was being processed by the unavailable component.

The data intake and query system 110, in some examples, can store the contextual information in a catalog, as described herein. In certain embodiments, the contextual information can correspond to information that the data intake and query system 110 has determined or learned based on use. In some cases, the contextual information can be stored as annotations (manual annotations and/or system annotations), as described herein.

The data intake and query system 110, in some examples, can include an additional catalog that monitors the location and storage of data in the storage system 116 to facilitate efficient access of the data during search time. Such a catalog may form part of storage system 116.

In some examples, the data intake and query system 110 can include a gateway 112 or other mechanism to interact with external devices or to facilitate communications between components of the data intake and query system 110. In some examples, the gateway 112 can be implemented to expose/provide/support an application programming interface (API). In certain embodiments, the API is a representational state transfer API (REST API).

In some examples, a user of the IT and security operations application 122 may install and configure, on computing devices owned and operated by the user, one or more software applications that implement some or all of the components of the IT and security operations application 122. For example, with reference to FIG. 1, a user may install a software application on one or more server computing devices owned by the user (e.g., server computing devices of computing resources 152A-152N of IT environments 150A-150N) and configure these applications to operate as one or more components of the intake system 120, indexing system 118, query system 114, storage system 116, or other components of the IT and security operations application 122. This arrangement generally may be referred to as an "on-premises" solution in that some or all of the IT and security operations application 122 is installed and operates on computing devices directly controlled by the user of the IT and security operations application 122. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of IT and security operations application 122 operate.

Accordingly, in some examples, one or more (or all) of the components of the IT and security operations application 122 can be implemented in a separate computing resource environment. In some examples, this separate environment is a shared computing resource environment or cloud-based service that refers to a service hosted by one more computing resources that are accessible to end users over a network (e.g., network(s) 104A-104B), for example, by using a web browser or other application on a client device 106 to interface with the remote computing resources. For example, a service provider may provide an IT and security operations application 122 by managing computing resources configured to implement various aspects of the system (e.g., intake system 120, indexing system 118, query system 114, storage system 116, SIEM application 126, vulnerability management application 124, other components, etc.) and by providing access to the IT and security operations application 122 to end users via a network. Typically, a user (e.g., an individual user, an organization, etc.) may pay a subscription or other fee to use such a service. Each subscribing user of the cloud-based service may be provided with one or more accounts that enables the user to configure a customized cloud-based system based on the user's preferences.

When implemented in a shared computing resource environment, the underlying hardware (non-limiting examples: processors, hard drives, solid-state memory, Random Access Memory (RAM), etc.) on which the components of the IT and security operations application 122 execute can be shared by multiple customers or tenants as part of the shared computing resource environment. In addition, when implemented in a shared computing resource environment as a cloud-based service, various components of the IT and security operations application 122 can be implemented using containerization or operating-system-level virtualization, or other virtualization technique. For example, one or more components of the intake system 120, indexing system 118, query system 114, SIEM application 126, vulnerability management application 124, etc., can be implemented as separate virtual machine instances and/or software containers. A software container instance can have certain computing resources (e.g., memory, processor, etc.) of an underlying hosting computing system (e.g., server, microprocessor, etc.) assigned to it, but may share the same operating system and may use the operating system's system call interface. Each container instance may provide an isolated execution environment on the host system, such as by providing a memory space of the hosting system that is logically isolated from memory space of other containers. Further, each container instance may run the same or different computer applications concurrently or separately and may interact with each other. Although reference is made herein to containerization and container instances, it will be understood that other virtualization techniques can be used. For example, the components can be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the IT and security operations application 122 in a shared computing resource environment can provide a number of benefits. In some cases, implementing the IT and security operations application 122 in a shared computing resource environment can make it easier to install, maintain, and update the components of the IT and security operations application 122. For example, rather than accessing designated hardware at a particular location to install or provide a component of the IT and security operations application 122, a component can be remotely instantiated or updated as desired. Similarly, implementing the IT and security operations application 122 in a shared computing resource environment or as a cloud-based service can make it easier to meet dynamic demand. For example, if IT and security operations application 122 experiences significant load at indexing or search, additional compute resources can be deployed to process the additional data or queries. In an "on-premises" environment, this type of flexibility and scalability may not be possible or feasible.

In addition, by implementing the IT and security operations application 122 in a shared computing resource environment or as a cloud-based service can improve compute resource utilization. For example, in an on-premises environment if the designated compute resources are not being used by, they may sit idle and unused. In a shared computing resource environment, if the compute resources for a particular component are not being used, they can be re-allocated to other tasks within the IT and security operations application 122 and/or to other systems unrelated to the IT and security operations application 122.

As mentioned, in an on-premises environment, data from one instance of an IT and security operations application 122 can be logically and physically separated from the data of another instance of an IT and security operations application 122 by virtue of each instance having its own designated hardware. As such, data from different users of IT and security operations application 122 is logically and physically separated from each other. In a shared computing resource environment, components of IT and security operations application 122 can be configured to process the data from one customer or tenant or from multiple customers or tenants. Even in cases where a separate component of an IT and security operations application 122 is used for each user, the underlying hardware on which the components of the IT and security operations application 122 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, IT and security operations application 122 can maintain logical separation between tenant data. For example, IT and security operations application 122 can include separate directories for different tenants and apply different permissions and access controls to access the different directories or to process the data, etc.

In some examples, tenant data from different tenants is mutually exclusive and/or independent from each other. For example, Tenant A and Tenant B do not share the same data, similar to the way in which data from a local hard drive of User A is mutually exclusive and independent of the data (and not considered part) of a local hard drive of User B. While Tenant A and Tenant B may have matching or identical data, each tenant would have a separate copy of the data. For example, with reference again to the local hard drive of User A and User B example, each hard drive could include the same file. However, each instance of the file would be considered part of the separate hard drive and would be independent of the other file. Thus, one copy of the file would be part of User A's hard drive and a separate copy of the file would be part of User B's hard drive. In a similar manner, to the extent Tenant A has a file that is identical to a file of Tenant B, each tenant would have a distinct and independent copy of the file stored in different locations on a data store or on different data stores.

Further, in certain cases, the IT and security operations application 122 can maintain the mutual exclusivity and/or independence between tenant data even as the tenant data is being processed, stored, and searched by the same underlying hardware. In certain cases, to maintain mutual exclusivity and/or independence between the data of different tenants, IT and security operations application 122 can use tenant identifiers to uniquely identify data associated with different tenants.

In a shared computing resource environment, some components of the IT and security operations application 122 can be instantiated and designated for individual tenants and other components can be shared by multiple tenants. In certain embodiments, a separate intake system 120, indexing system 118, and query system 114 can be instantiated for each tenant (e.g., by hosting different virtual machines, container instances, etc., for each tenant), whereas the storage system 116 or other components (e.g., data store, metadata catalog, and/or acceleration data store, described below) can be shared by multiple tenants. In some such embodiments where components are shared by multiple tenants, the components can maintain separate directories for the different tenants to ensure their mutual exclusivity and/or independence from each other. Similarly, in some such embodiments, the IT and security operations application 122 can use different hosting computing systems or different isolated execution environments to process the data from the different tenants as part of the intake system 120, indexing system 118, and/or query system 114.

In some embodiments, individual components of the intake system 120, indexing system 118, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In certain embodiments, an indexing system 118 (or certain components thereof) can be instantiated and designated for a particular tenant or shared by multiple tenants. In some embodiments where a separate indexing system 118 is instantiated and designated for each tenant, different resources can be reserved for different tenants. For example, Tenant A can be consistently allocated a minimum of four indexing nodes and Tenant B can be consistently allocated a minimum of two indexing nodes. In some such embodiments, the four indexing nodes can be reserved for Tenant A and the two indexing nodes can be reserved for Tenant B, even if Tenant A and Tenant B are not using the reserved indexing nodes.

In embodiments where an indexing system 118 is shared by multiple tenants, components of the indexing system 118 can be dynamically assigned to different tenants. For example, if Tenant A has greater indexing demands, additional indexing nodes can be instantiated or assigned to Tenant A's data. However, as the demand decreases, the indexing nodes can be reassigned to a different tenant or terminated. Further, in some embodiments, a component of the indexing system 118 can concurrently process data from the different tenants.

In some embodiments, one instance of query system 114 may be shared by multiple tenants. In some such cases, the same search head can be used to process/execute queries for different tenants and/or the same search nodes can be used to execute queries for different tenants. Further, in some such cases, different tenants can be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the IT and security operations application 122, etc.

In some cases, by sharing more components with different tenants, the functioning of the IT and security operations application 122 can be improved. For example, by sharing components across tenants, system 110 can improve resource utilization thereby reducing the numbers or amounts of resources allocated as a whole. For example, if four indexing nodes, two search heads, and four search nodes are reserved for each tenant, then those compute resources are unavailable for use by other processes or tenants, even if they go unused. In contrast, by sharing the indexing nodes, search heads, and search nodes with different tenants and instantiating additional compute resources, the IT and security operations application 122 can use fewer resources overall while providing improved processing time for the tenants that are using the compute resources. In some cases, by keeping computing resources in more active use, these computing resources may even be able to quickly perform tasks for its users, e.g., by having resources, code, etc., in a "hot" state meaning it can be more responsive, as opposed to having resources in a "cold" state (e.g., in an idle or sleeping state) that may take longer to be ready to act. For example, if Tenant A is not using any search nodes and Tenant B has many searches running, the IT and security operations application 122 can use search nodes that would have been reserved for Tenant A to service Tenant B. In this way, IT and security operations application 122 can decrease the number of compute resources used/reserved, while improving the search time for Tenant B and improving compute resource utilization. Thus, fewer physical computing resources may be needed (leading to reduced energy utilization, fewer points of failure, lower costs for all) while overall system performance can be improved.

A security management application, such as a security information and event management (SIEM) application 126, may be part of IT and security operations application 122 and provide analysis and management functionalities for security-related events generated based on computing activity. A SIEM application 126 may also provide analytical tools having a range of functions including trend analysis, event identification, and alerting. For example, a SIEM application 126 can utilize data (e.g., machine data, unstructured data, weblogs, etc.) collected by the data intake and query system 110 from one or more computing resources 152A-152N to identify security-related events (and/or groups of events) based on criteria and/or present summaries of events or groups of events via one or more GUIs, such as those implementing a security console. Examples of computing resources 152 from which data can be collected can include one or more computing devices, e.g., a server computing device, a router, network devices, user device, or more specifically, from software systems implemented by those devices. These events can pertain to an activity occurring within the IT environments 150, such as a computer action, access control decision, endpoint activity, a communication (sent or received over a network), network activity (e.g., network requests, connection attempts, traffic via a network device (e.g., a firewall, a router, a switch, or a network), requests for proxy or HTTP data, or creation of new domains), or other activity.

As shown in FIG. 1, a vulnerability management application 124 can be implemented as part of a SIEM application 126 though in other examples the vulnerability management application 124 may be implemented separately but in conjunction with the SIEM application 126 (e.g., in that it can interoperate with the SIEM application 126).

As introduced above, a SIEM application 126 can identify and make visible security-related issues for IT environments 150. For example, the SIEM application 126 may identify detected security-related risks associated with the IT environment and, as one example, determine risk scores for these identified risks. In this context, a "risk score" broadly refers to any type of quantitative value used to indicate an expected level of risk posed by a "risk object" (e.g., a data object representing a user, a physical or virtual computing device, or a software application) to an IT environment based on an analysis of data reflecting the risk object's activity. The SIEM application 126 can generate or obtain risk scores for risk objects in any number of ways including, but not limited to, executing correlation searches against event data indicating activity within IT environments to identify potential incidents, using a risk score analysis framework to assign risk scores to events contributing to identified incidents and aggregating the risk scores for particular risk objects, receiving user input assigning a risk score to a risk object, and the like. For example, when a correlation search identifies a set of events matching a specified criteria indicating activity of interest in an IT environment, the SIEM application 126 can generate an alert in the form of a "notable event" or other similar data object. The SIEM application 126 can further associate risk scores with events contributing to the notable event and, by extension, with risk objects identified by the events. These risk scores can provide one efficient measure of a given risk object's potential risk to an IT environment.

As another example, a host device in an IT environment may generate machine data in the form of network traffic sent by the host to various other hosts. A correlation search that is designed to detect instances of a host sending personally identifiable information (PII) may result in the creation of several notable events over a period of days, where the events indicate that the host might be sending PII. For example, a correlation search may be configured to identify, within events reflecting network traffic sent by hosts in a computing environment, instances of data that appear to correspond to Social Security Numbers, credit card numbers, and the like. Responsive to the identification of these notable events, a risk object corresponding to the host computing device can be assigned a risk score by a risk analysis framework of the SIEM application 126. The risk score can be assigned, for example, as part of executing the correlation search, based on an ad hoc adaptive response action, or using some other mechanism.

Once assigned to the risk object, the risk score can be displayed in various interfaces provided by the SIEM application 126 to provide users with an indication of how risky the host sending the PII may be to a computing environment in which the host is operating.

As shown in FIG. 1, the IT and security operations application 122 includes a SIEM application 126 comprising software components executed by one or more electronic computing devices. The computing devices, in some examples, are provided by a cloud provider network 108 (e.g., as part of a shared computing resource environment). In other examples, the SIEM application 126 operates on computing devices managed within an on-premises datacenter or other computing environment, or on computing devices located within a combination of cloud-based and on-premises computing environments.

As indicated, IT and security operations application 122 includes a SIEM application 126 that enables security teams to quickly detect and respond to internal and external attacks, to simplify threat management, and safeguard computing resources. In some examples, the SIEM application 126 enables security teams (e.g., analyst teams 102A-102BN) to use data to gain organization-wide visibility and security intelligence whether users' resources are deployed on-premises, in a public or private cloud, or in any combination of these. The SIEM application 126 can be used for continuous monitoring, incident response, running a security operations center or for providing users with a window into business risk, among other features.

For example, users associated with IT operations or security teams (sometimes referred to herein as "analysts," such as analysts that may be part of example analyst teams 102A and 102N) can use various client devices 106 to interact with the SIEM application 126 via one or more network(s) 104A to analyze information related to IT environments for which they are responsible (such as, for example, one or more IT environments 150A, . . . , 150N, which may be accessible over one or more network(s) 104B, where network(s) 104B may be the same or different from network(s) 104A). Although only two analyst teams are depicted in the example of FIG. 1, in general, any number of separate analyst teams can concurrently use the SIEM application 126 to monitor any number of respective IT environments, where each security team may be responsible for one or more tenant networks.

In some examples, users can interact with a SIEM application 126 and data intake and query system 110 using client devices 106. The client devices 106 may communicate with the SIEM application 126 and with data intake and query system 110 in a variety of ways such as, for example, over an internet protocol via a web browser or other application, via a command line interface, via a software developer kit (SDK), and the like. In some examples, client devices 106 can use one or more executable applications or programs from the application environment to interface with the data intake and query system 110, such as the SIEM application 126. The SIEM application 126 can interface with the data intake and query system 110 to obtain relevant data, process the data, and display it in a manner relevant to the IT operations context. As shown, the SIEM application 126 further includes additional backend services, middleware logic, front-end user interfaces, data stores, and other computing resources, and provides other facilities for ingesting use case specific data and interacting with that data.

The SIEM application 126 can include security posture interfaces, incident review interfaces, among many other possible types of interfaces that can be provided to users to display information. In some examples, the SIEM application 126 further includes middleware business logic implemented on a middleware platform of the developer's choice. Furthermore, in some examples, a SIEM application 126 is instantiated and executed in a different isolated execution environment relative to the data intake and query system 110. As a non-limiting example, in examples where the data intake and query system 110 is implemented at least in part in a Kubernetes cluster, the SIEM application 126 may execute in a different Kubernetes cluster (or other isolated execution environment system) and interact with the data intake and query system 110 via the gateway 112.

In some examples, a user (also referred to herein as a "customer," "tenant," or "analyst") of a SIEM application 126 can create one or more user accounts to be used by analysts or other users. A user of the SIEM application 126 can use the application to monitor one or more IT environments for which the user is responsible (illustrated by example IT environments 150A, . . . , 150N). Each IT environment 150 can include any number of computing resources 152 (e.g., computing resources 152A, . . . , computing resources 152N) operating as part of a corporate network or other networked computing environment. Although the IT 150A-150N are shown as separate from the provider 108 in FIG. 1, more generally, an IT environment can include computing resources hosted in an on-premises network, in the provider 108, in another provider network, or any combinations thereof (e.g., as a hybrid cloud network).

Any of the computing resources 152 in an IT environment can potentially serve as a source of incident-related data other data analyzed by a SIEM application 126. The computing resources 152A-152N can include various types of computing devices, software applications, and services including, but not limited to, a data intake and query system (which itself can ingest and process machine data generated by other computing resources), a SIEM system, a REST client that obtains or generates data based on the activity of other computing resources, software applications (including operating systems, databases, web servers, etc.), routers, intrusion detection systems and intrusion prevention systems (IDS/IDP), client devices (for example, servers, desktop computers, laptops, tablets, etc.), firewalls, switches, and the like. The computing resources 152 can execute upon any number separate computing devices and systems within an IT environment 150.

During operation, data intake and query systems, SIEM systems, REST clients, and other system components of IT environments obtain operational, performance, and security data from computing resources, analyze the data, and optionally identify potential IT-related incidents. A data intake and query system 110 in an IT environment, for example, might identify potential IT-related incidents based on the execution of one or more correlation searches against data ingested and indexed by the system. Other data sources 544 may obtain incident-related data using other processes. Once obtained, data indicating such incidents is sent to the data intake and query system 110 or SEIM application 126 via an on-premises proxy or other type of forwarder. For example, data reflecting activity in the IT environments 150A-150N can be sent to the data intake and query system 110 via a REST API endpoint implemented by a gateway 112 or a similar gateway of the SIEM application 126. As mentioned elsewhere herein, a data intake and query system 110 or IT and security operations application 122 may ingest, index, and store data received from each IT environment in association with user accounts such that various users' data is segregated from other user data (for example, when stored in common storage 116 of the data intake and query system 110).

The operation of an SIEM application 126 generally begins with the ingestion of data reflecting activity within one or more IT environments (e.g., activity involving computing resources 152A of an IT environment 150A). In some examples, users configure a data intake and query system 110 or SIEM application 126 to obtain, or "ingest," data from one or more defined data sources, where such data sources can be any type of computing device, application, or service that supplies information that users may want to store or analyze, and where such data sources may include one or more of the computing resources 152A-150N, or other data sources which generate data based on the activity of one or more computing resources. As mentioned, examples of data sources include, but are not limited to, a REST client, applications, routers, intrusion detection systems (IDS)/intrusion prevention systems (IDP) systems, client devices, firewalls, switches, or any other source of data reflecting activity in IT environments. Some of these data sources may themselves collect and process data from various other data generating components such as, for example, web servers, application servers, databases, firewalls, routers, operating systems, and software applications that execute on computer systems, mobile devices, sensors, Internet of Things (IoT) devices, etc. The data generated by the various data sources can be represented in any of a variety of data formats.

In some examples, data ingested by a data intake and query system 110 or SIEM application 126 from configured data sources can be represented in the SIEM application 126 by data structures referred to as "incidents, "events," "notables." In some examples, a SIEM application 126 can be configured to create and recognize different types of incidents depending on the corresponding type of data ingested, such as "IT incidents" for IT operations-related incidents, "security incidents" for security-related incidents, and so forth. A notable can be stored, for example, in a notables index can further include any number of contributing events. As indicated above, a notable can also be associated with one or more risk objects, where each risk object corresponds to an entity (e.g., a user, a virtual or physical computing device, an application, etc.).

In FIG. 1, a vulnerability management application 124 is illustrated that provides user visibility into actual or potential vulnerabilities across one or more IT environments. The vulnerability management application 124 may provide a variety of vulnerability functionalities, such as vulnerability assessment, vulnerability reporting and visualization, remediation management, continuous monitoring, and the like. In some examples, users (e.g., analyst teams 102) can interact with the vulnerability management application 124 via a front end service 128, which may provide/host interfaces and functionalities for one or more of a vulnerability workbench 130, a vulnerability dashboard 132, vulnerability reporting, critical asset center (for tracking critical assets and corresponding risk footprints), a CVE viewer (e.g., for viewing CVE information together with associated impacts, such as which systems in the IT environment(s) 150 may be affected), etc. The vulnerability management application 124 may be provided using a variety of technologies, such as being a web-based application, part of a standalone application, via API calls, or the like.

A vulnerability dashboard 132 may be provided by the vulnerability management application 124 to provide real-time (or near-real-time) visibility into vulnerability management involving one or more IT environments 150 for particular users or types of users, such as executives, security analysts 102, or the like. The vulnerability dashboard 132 may appear differently for different types of users (e.g., based on their role or group membership), such as by including different "panels" (e.g., portions of a user interface) to different users. For example, high-level vulnerability summary information may be presented to executive users such as a Chief Information Security Officer (CISO), whereas lower-level vulnerability information can be presented to technical users such as analysts for operational use (e.g., to allow these users to monitor vulnerabilities involving critical or external-facing assets). By way of example, a vulnerability dashboard 132 may provide information such as numbers of vulnerabilities affecting an IT environment, numbers of vulnerabilities that have been or have not been remediated, numbers of vulnerable assets, remediation performance statistics (e.g., an average time to remediate a vulnerability, an average age of un-remediated vulnerability), numbers of critical vulnerabilities, numbers of assets affected by critical vulnerabilities, summaries or identification of particularly vulnerable assets (e.g., due to a number of vulnerabilities affecting the asset, an importance or characteristic of the asset, or both), and the like.

A vulnerability workbench 130 may be provided by the vulnerability management application 124 to provide in-depth visibility into vulnerabilities affecting the IT environment and allow for the management of these vulnerabilities and associated affected assets. For example, the vulnerability workbench 130 may provide a listing of vulnerabilities in the form of a table, wherein each row of the table is associated with a particular vulnerability and various columns are provided that are associated with the vulnerability (e.g., a CVE identifier, a description, a publishing date, an age of the vulnerability, a base vulnerability score, etc.) and/or associated with the impact of the vulnerability within the IT environment (e.g., a value indicating an adjusted vulnerability score/impact reflecting the vulnerability as applied to the IT environment, a value indicating how many assets are affected by the vulnerability, or the like).

In some examples, users may interact with the vulnerability workbench 130 to manage vulnerabilities, for example, to assign a vulnerability to an analyst or team to be investigated or remediated, to adjust a vulnerability score associated with a vulnerability as applied to the particular IT environment), to view more information about a vulnerability and/or impacted assets, to initiate particular remediation actions, etc. Moreover, in some examples, users can utilize the vulnerability workbench 130 to "filter" vulnerabilities, e.g., to include or eliminate particular types of vulnerabilities (e.g., based on an associated operating system or application associated with a vulnerability, a category of vulnerability, a business unit, a priority, a location of affected assets, and/or other fields) so that particular vulnerabilities can be hidden or brought to the forefront for an analyst. As another example, the vulnerability workbench 130 may allow users to "clone" a workbench item (itself made up of one or multiple vulnerabilities) into one or more other workbench items, whereby an analyst can assign these different items to multiple teams, track remediation progress separately, or the like. In some examples, another type of filter may be supported whereby filters can be applied to cloned workbench items such that the vulnerability is tracked separately for separate assets, locations, or the like, as specified by the filter(s). As yet another example, the vulnerability workbench 130 may allow users to "merge" workbench items into a single workbench item, such that all are tracked commonly. This may be particularly helpful when a set of vulnerabilities are related in some manner, whether they affect the same type of component or system, the same asset or class of assets, or the like, and thus the "noise" from multiple vulnerabilities can be reduced into a single vulnerability.

To implement these and other functionalities, the vulnerability management application 124 also includes a vulnerability management module 140 to manage to ingestion of vulnerability data, enrich the vulnerability data (e.g., based on third-party data, and/or based on organizational context provided by the SIEM application 502 such as metadata of exists assets in the IT environment), execute correlation searches (e.g., using the data intake and query system 110) to identify vulnerabilities (and types thereof, such as "severe" vulnerabilities), and provide data for the creation of vulnerability workbench 130 and/or vulnerability dashboard 132. In some examples, the vulnerability management module 140 interacts with the SIEM application 126 and/or data intake and query system 110 to perform ones of these tasks. For example, the vulnerability management module 140 may access IT environment asset data from the SIEM application 126 as part of identifying assets that may be affected by vulnerabilities. As another example, the vulnerability management module 140 may access event data, vulnerability data, vulnerability scan data, and the like from the data intake and query system 110, perhaps via use of its query system 114, storage system 116, and/or indexing system 118 described elsewhere herein.

The vulnerability management module 140 may obtain (or operate upon) vulnerability data of a variety of types and/or sources. In some examples, a user may utilize one or more vulnerability scanning agents 154A-154N that scan computing resources 152A-152N within IT environments 150A-150N. In some examples, these scanning agents 154 can be configured to, upon performing scans of computing resources to identify vulnerabilities, send vulnerability scan result data to the data intake and query system 110 for ingestion. In some examples, the data intake and query system 110 (or another component of the IT and security operations application 122, such as the vulnerability management module 140) may itself obtain vulnerability scan data, such as by requesting it from the scanning agents 154 directly, obtaining it from a third-party server (e.g., provided by an organization or company that provides the scanning agents 154), or the like. Additionally, or alternatively, the vulnerability management module 140 may obtain vulnerability data from other third-party sources, e.g., a publisher of CVE type information, a publisher of new vulnerabilities, from an Internet-based vulnerability scan services (e.g., a web vulnerability scanner). As yet another example, the vulnerability management module 140 may receive, via the front end service 128, vulnerability data provided by its users, such as analyst team(s) 102 providing (e.g., uploading) penetration test findings, information associated with coding flaws, information associated with misconfigurations, etc. This vulnerability data can also be used to populate the vulnerability workbench 130, vulnerability dashboard 132, and/or other interfaces provided by the vulnerability management application 124.

In some examples, users may interact with the vulnerability workbench 130 to adjust vulnerability scores associated with vulnerabilities as applied to the particular IT environment. For example, the vulnerability management application 124 may provide information about the affected asset(s) (e.g., from IT asset data managed by the SIEM application 126) such as their location, their use, installed operating systems and/or software, their network connectivity, associated firewall or antivirus settings, or the like. As a result, a user may determine that the vulnerability is particularly impactful or not impactful to their particular environment and can use user interface elements (e.g., buttons, text input boxes, etc.) to cause a vulnerability score (e.g., associated with a vulnerability) to be modified upward or downward. Moreover, in some examples, the vulnerability management module 140 itself may likewise be configured to adjust certain types of vulnerability scores on its own, e.g., by determining that a vulnerability applies to a particular operating system and determining that assets exist in the associated IT environment that utilize that particular operating system), in which case the vulnerability score can be upwardly adjusted to reflect an increased severity/risk to the organization.

Figure 2:
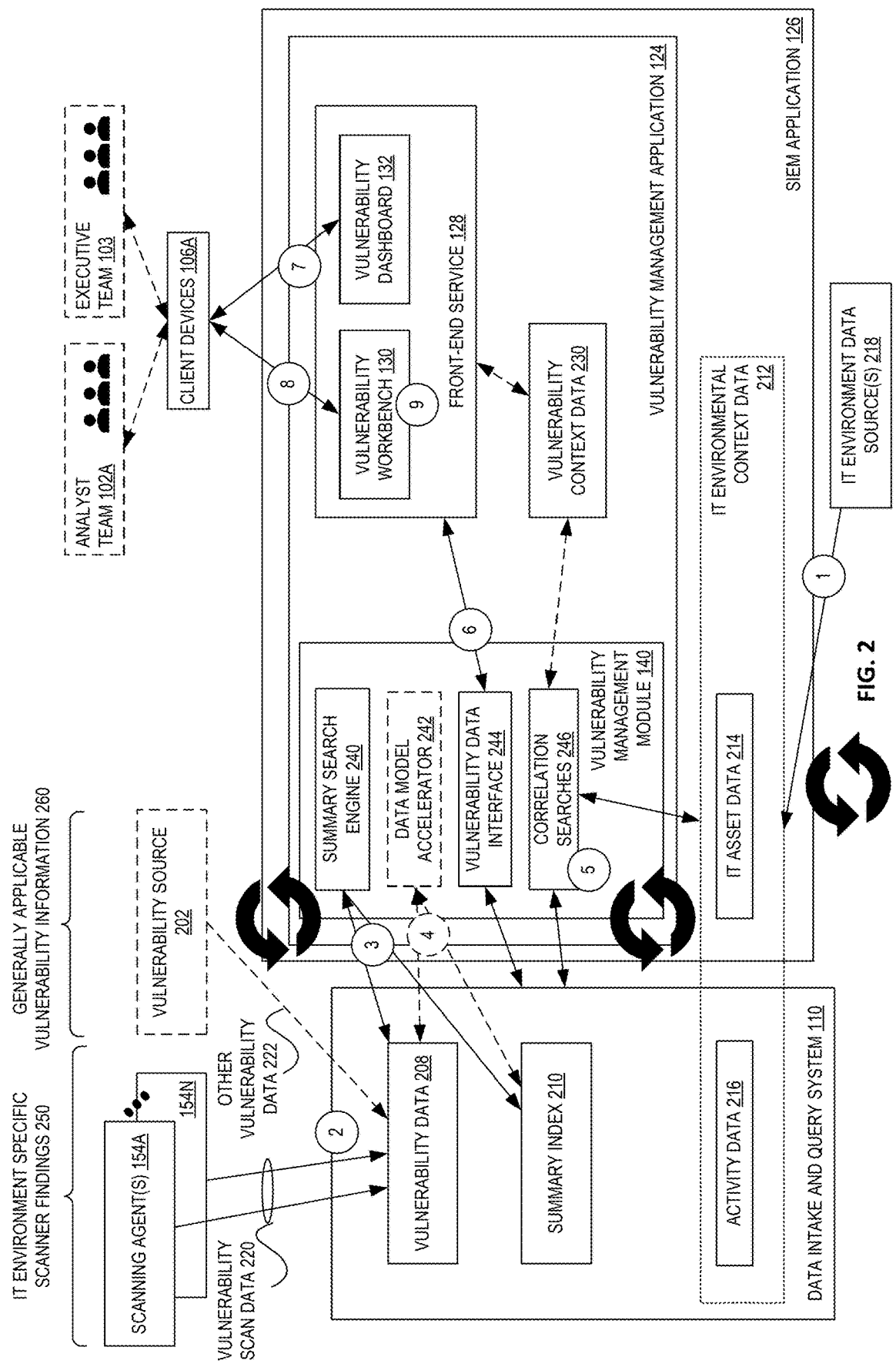
FIG. 2 illustrates additional details of the components and operation of a vulnerability management application according to some examples.

For further detail, FIG. 2 illustrates additional details of the components and operation of a vulnerability management application according to some examples. In this figure, the circles labeled (1)-(9) illustrate exemplary operations in which a vulnerability management application 124 obtains vulnerability data, enriches the vulnerability data, identifies vulnerability issues to be presented to users (e.g., for further analysis and/or remediation), and provides vulnerability workbench 130 and/or vulnerability dashboard 132 information to users.

At circle (1), one or more IT environment data sources 218—whether it be software agents executed in the IT environment, a third party catalog system, an analyst, or the like—provide IT environmental context data 212 to the IT and security operations application 122. This IT environmental context data 212 may include IT asset data 214, such as a list of computing resources in the IT environment and associated metadata. This could include, for example, an entry for each server device in a particular IT environment, potentially with information such as its type, installed hardware components, network (e.g., IP) address(es), hostname, physical location, installed operating system(s), installed software, importance/use (e.g., "critical" or "developmental"), and potentially any other type of associated metadata that may be relevant to a particular IT environment or user. The IT asset data 214 may also include entries for other types of computing hardware resources, such as switches, routers, load balancers, firewalls, racks, power supplies, and the like. Additionally, or alternatively, computing resources may be tracked at other levels, i.e., not just at the hardware level. As one example, IT asset data 214 may also include/ track software such as virtual machines, containers, applications, or the like. Various techniques and systems for taking inventories of IT assets are known to those of skill in the art, including manual processes and/or automated processes.

The IT environmental context data 212 may additionally, or alternatively, include activity data 216 associated with the IT environment and potentially individual computing resources. For example, activity data 216 may include network data such as observed network data arriving at a border of the IT environment (e.g., at an "edge" router, gateway, firewall, etc.) either from outside of the IT environment (as inbound traffic) or inside of the IT environment (as outbound traffic). The activity data 216 can include overall amounts of traffic seen, types of traffic seen, indications of abnormal or prohibited (e.g., "blocked") traffic, summaries of types of traffic (e.g., DNS resolution requests, port-scan activity, SSH traffic, peer-to-peer traffic), etc. The activity data 216 can include network activity data associated with a particular computing devices (e.g., inbound or outbound observed traffic types or summaries) or even particular sources or destinations of traffic on a computing device (e.g., a port, a virtual machine, a process).

As shown with reference to circle (2), one or more scanning agents 154A-154N may be executed within an IT environment (not shown) to identify vulnerabilities that may be associated with particular computing resources, which can be hardware and/or software vulnerabilities. The results of such scans provide IT environment-specific scanner findings 250 may identify particular vulnerabilities and assets that may be associated with these vulnerabilities. These results are transmitted (e.g., by the scanning agents 154) as vulnerability scan data 220 to the data intake and query system 110. In other examples, this vulnerability scan data 220 may instead be provided by another third-party system, such as a server that the scanning agents 154 send their vulnerability scan data 220 to, which may be owned or operated by a developer of the scanning agents 154. As one example, the data intake and query system 110 may obtain vulnerability scan data 220 from a third-party system, e.g., by sending a request for vulnerability scan data to an API endpoint associated with or provided by the third-party and receiving the vulnerability scan data in a response to that request.

Additionally, or alternatively, one or more vulnerability sources 202 may provide other vulnerability data 222 to the data intake and query system 110, which may constitute generally-applicable vulnerability information 260 that may not be specifically associated with an individual IT environment. For example, this other vulnerability data 222 may include published vulnerabilities (e.g., CVEs from the NIST National Vulnerability Database (NVD) and/or the MITRE CVD database), other descriptions of vulnerabilities associated with particular systems or software, descriptions of misconfigurations of particular software, or the like. However, in some cases, this vulnerability data may be associated with a particular IT environment, such as by a user (or system) providing results from penetration testing or other security-related information.

Notably, in some examples, the IT and security operations application 122 can support a variety of different types of vulnerability scan data 220 provided by multiple different types of scanning agents 154 or vulnerability sources 202. For example, this data can be imported via different "add-ons" (enabled/executed by the IT and security operations application 122) that are specific to a particular scanner, which can convert the scan data, from different scanners, into a common format.

For example, as reflected with regard to circle (3), a summary search engine 240 may interact with stored vulnerability data 208 and work to convert or normalize it in some manner, e.g., storing it in one or more summary indexes 210. As one example, this conversion could include splitting a single stored vulnerability data 208 record (e.g., indicating a vulnerability associated with multiple systems) into multiple such records (e.g., one per system). As another example, this conversion could include combining multiple records into a single record, updating field names, removing particular fields/values, etc. In some examples, a summary index enables the efficient search on potentially large volumes of data as it is smaller than the original dataset (e.g., raw vulnerability data 208 of potentially many different types) and contains data that is relevant to the search/queries that are run against it. In some examples, the summary search engine 240 periodically (e.g., according to a schedule, or on an event-driven basis such as due to the presence of new vulnerability data 208) executes a scheduled search that runs in the background, extracting a precise set of statistical information from this potentially large and varied dataset of vulnerability data 208. The results of each run of the search are stored in a summary index 210, and thereafter queries against the completed summary index should complete much faster than similar searches run against the original "raw" source dataset of vulnerability data 208. In some examples, the summary index is also statistically accurate, in part because the scheduled search that updates the summary index runs on an interval that is shorter than the average time range of the searches run against the summary index. For example, if there is a need to run ad-hoc searches over the summary index that covers the past seven days, the system can be configured to build and update the summary index with a search that runs hourly.

In some examples, at circle (4), a data model accelerator 242 can operate upon the one or more summary indexes 210 of vulnerability data. This data model accelerator 242 can utilize the summary index(es) 210 and/or "raw" vulnerability data 208 to further "accelerate" the data in the summary index(es) 210. By way of example, this acceleration can include evaluating data (e.g., to ensure results are named/defined according to a common data model), renaming fields (to fit into a common data model), modifying data, summarizing data, reformatting the data (e.g., into key-value pairs or the like), etc., to ensure rapid and performant access to this data. Ultimately, this "accelerated" data can be re-written back to the summary index(es) 210.

The vulnerability management module 140, as reflected at illustrated circle (5), can cause a number of correlation searches 246 to be executed to identify vulnerabilities of note, e.g., vulnerabilities associated with (or potentially associated with) computing resources in the associated IT environment(s). For example, a correlation search 246 may include identifying a newly published vulnerability that "matches" some computing resource in the IT environment (e.g. via analyzing IT asset data 214 together with vulnerability data, whether as raw vulnerability data 208 or as presented in the summary index 210), meaning that the vulnerability affects the resource. As a specific example, if a vulnerability data identifies an affected software library or operating system as being vulnerable, the correlation search 246 can determine if any IT assets, via IT asset data 214, utilize that particular library or operating system. As another example, data from a recent vulnerability scan identifying a known vulnerability of a known resource can be identified. Additionally, examples can identify vulnerabilities having an associated risk score (e.g., a Common Vulnerability Scoring System (CVSS) risk score) meeting or exceeding a risk threshold value, which may be configured by a user for a particular IT environment. Moreover, correlation searches 246 can also include correlating a vulnerability (e.g., that utilizes a particular type of network-based communications) with evidence of the vulnerability being exploited via the activity data 216—for example, a vulnerability that utilizes a particular atypical network port can be correlated with activity data 216 indicating that a large amount of such atypical traffic has recently spiked. Other examples include identifying "trending" vulnerabilities (e.g., via some publication from a vulnerability source 202) that are new or otherwise serious, identifying vulnerabilities that may have been exploited (e.g., based on evidence in activity data 216), identifying vulnerabilities (which otherwise may not be deemed of interest) associated with "critical" IT assets, identifying vulnerabilities with particular features (e.g., allows remote code execution), etc. Accordingly, a near limitless amount of different correlation searches 246 can thus be implemented based on the particular needs of the implementor, the involved IT environments, and the types of vulnerability and/or IT environmental context data 212 that is available.

In some examples, such vulnerabilities are marked (or otherwise caused) to be presented to users, e.g., analyst team 102A, via vulnerability workbench 130 and/or vulnerability dashboard 132. This can include creating a new entry in a particular data store (e.g., a "vulnerabilities" table of a database utilized by the front-end service 128), updating an existing entry in a data store (e.g., setting a particular flag or value to cause it to be presented), or the like.

For some vulnerabilities of interest, in some examples, risk scores associated with involved IT assets (or vulnerabilities themselves) can be modified by the vulnerability management module 140 to reflect a higher or lower risk, assisting the users of the system. For example, the SIEM application 126 may store, in a risk index, events or other data objects representing or related to one or more risk objects. The vulnerability management application 124, then, may then identify vulnerabilities (e.g., satisfying some criteria) that cause it to raise or lower a risk profile of an entity corresponding to a risk object (e.g., a user or a computing resource) in this risk index. This could include, for example, raising a risk score associated with a server device risk object when a vulnerability is first detected for it and if it is deemed public facing, or is a "critical" asset, or there is evidence of malicious/atypical traffic involving it, or the like.

Thus, in some examples, the system itself can thus "elevate" certain vulnerabilities (to be presented in a different way by the front-end service 128) that need immediate attention and/or decrease the relative importance of vulnerabilities that may not apply in an environment or are otherwise determined to be of low risk or impact.

Thereafter, based on data presented via a vulnerability data interface 244 (e.g., providing vulnerability data according to a common data model) at circle (6), the front-end service 128 of the vulnerability management application 124 can present a vulnerability dashboard 132 to users (e.g., of an analyst team 102A, executive team 103, or the like) at circle (7) presenting a high-level view of the state of vulnerability management within the IT environment(s), and/or at circle (8), presenting a vulnerability workbench 130 to users to allow for vulnerability information to be viewed, analyzed, investigated, reassigned for remediation, adjusted, and the like. As indicated, these interfaces can be provided by the front-end service 128 via use of a vulnerability data interface 244 that itself accesses data from one or more summary indexes 210, and/or the "raw" vulnerability data 208, and other data sources of the IT and security operations application 122.

Figure 3:
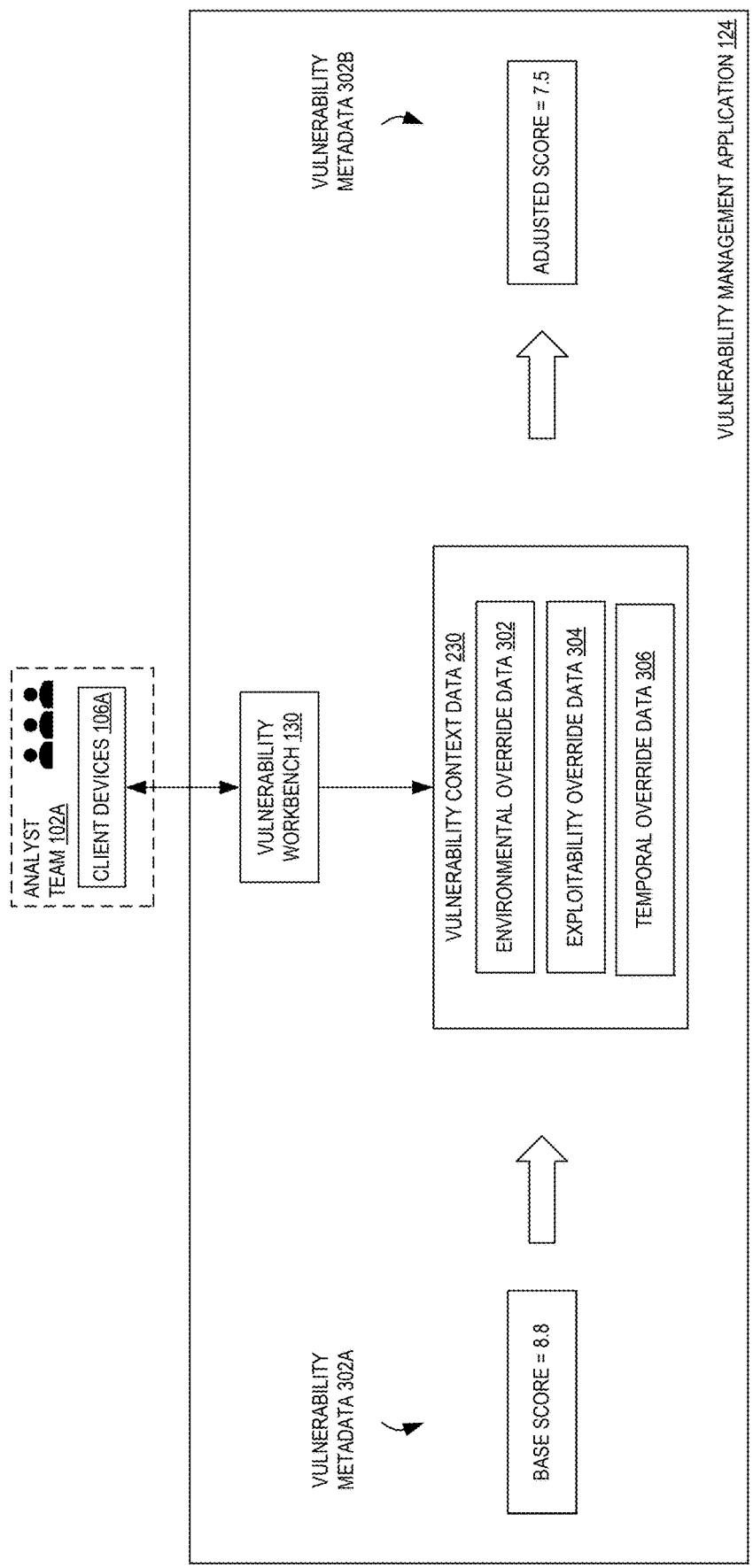
FIG. 3 illustrates an example vulnerability score modification by a vulnerability management application according to some examples.

As indicated, via use of the vulnerability workbench 130, a user can view information associated with vulnerabilities. However, in some examples, the user can utilize user interface elements provided by the vulnerability workbench 130 at circle (9) to modify these vulnerabilities (e.g., to modify vulnerability scores) by providing vulnerability context data 230. For example, FIG. 3 illustrates an example vulnerability score modification by a vulnerability management application according to some examples. As shown, a vulnerability may be ingested into the system (e.g., as part of vulnerability scan data 220, other vulnerability data 222, or the like) and thereafter may be surfaced, via the vulnerability workbench 130, for an analyst (e.g., of analyst team 102A) to investigate. As shown and discussed in additional detail later herein, the vulnerability workbench 130 can present to the user a variety of types of information regarding a vulnerability, such as its name, unique identifier, base "risk" score, a description of the vulnerability, a description of what types of systems it impacts. Further, in some examples, the vulnerability workbench 130 can further provide IT environment-specific information along with the vulnerability data, such as numbers or identifiers of computing resources in the IT environment that may be affected by the vulnerability, numbers or identifiers of particular "classes" of computing resources in the IT environment that may be affected by the vulnerability (such as "critical" assets), descriptions of recent anomalous activity observed with regard to these affected assets, and the like. With this information, an analyst user could decide to further investigate the issue themselves, re-assign the vulnerability for another analyst or user to investigate, cause remediative actions to be performed (e.g., quarantine the device, halt the device, increase logging associated with the device, send messages to other systems or users), etc.

In some examples, via one or more user interface elements, a user may also adjust the "importance" of a vulnerability (e.g., through a "risk score" or similar measure associated with the vulnerability or resource) based on IT environment specific context information. For example, if a user determines (e.g., via the vulnerability workbench 130) that the vulnerability requires network access to be exploited, and the user knows/determines (e.g., via the workbench, another system, or even knowledge or investigation) that the potentially affected resource is not network-connected, the user could "downgrade" the vulnerability (e.g., cause a total risk score to be reduced). As another example, if a user determines that a vulnerability affects a critical asset (e.g., one that is public-facing, Internet-accessible, serving production traffic, or the like) the user could "upgrade" the vulnerability by causing the total risk score to be increased; likewise, if the user determines that there is some evidence of a potential vulnerability being attempted/exploited (e.g., via the vulnerability workbench 130 or another system) such as atypical network traffic matching the vulnerability attack vector, the user again may cause a risk score associated with the vulnerability (and/or individual computing resources) to be increased. As a result, by changing such risk scores, the vulnerabilities are thus "triaged" and can be addressed according to importance specific to the IT environment, as opposed to the scenario in many systems when (potentially huge numbers of) vulnerabilities are treated as essentially equal, or where context is not taken into account and thus seemingly "higher risk" vulnerabilities (that in reality are not an issue due to context factors of the involved IT environment) are addressed before seemingly "lower risk" vulnerabilities that may be a more real threat to the organization.

Accordingly, as shown in FIG. 3, an analyst of analyst team 102A may interact with the vulnerability management application 124 via a vulnerability workbench 130 to analyze a vulnerability that has been ingested into the system and determined to be presented to the user, for example, due to the user's configuration of the application designating which vulnerabilities are to be presented according to some configured logic, due to a vulnerability having a risk score meeting or exceeding some threshold, due to a vulnerability being designated as applicable to particular computing resources in the IT environment, etc. Upon analyzing the vulnerability (based in whole or in part on the information provided by the vulnerability workbench 130, which can include vulnerability and/or IT environment data), the user may be presented user interface elements (e.g., via buttons, such as within a modal window) by the vulnerability workbench 130 allowing the user to provide vulnerability context data 230 that can "adjust" a risk score associated with the vulnerability.

As shown, a user may thus provide user input indicating environmental override data 302, exploitability override data 304, and/or temporal override data 306, though in other examples more, fewer, and/or different types of vulnerability context data 230 may be utilized. Environmental override data 302 can be provided to adjust the vulnerability based on particulars of the affected resources and/or IT environment itself, and may include, for example, options to designate whether (or, to what level) the affected systems have a confidentiality requirement, an integrity requirement, an availability requirement. Exploitability override data 304 can indicate how the vulnerability would need to be exploited for the particular computing resources and may include indicators of what the modified attack vector would be, what the modified attack complexity would be, what the modified privileges would be, etc., when these exist. Temporal override data 306 can include indicators of a maturity of exploit code (e.g., whether there is proof-of-concept exploit code available versus a mature widely distributed exploit existing), a remediation option level (e.g., is there an official fix versus none known), a confidence level in the exploit being legitimate, or the like.

By providing this additional information, the vulnerability workbench 130 can store this as part of vulnerability context data 230 which can be further used to adjust the risk score associated with these vulnerabilities. As shown, a vulnerability having, as part of its vulnerability metadata 302A, a "base" risk score (e.g., from a publisher of the vulnerability) of 8.8 (e.g., out of ten)—indicating a serious vulnerability—may be reduced (or increased) by the user input. In this example, via providing vulnerability context data 230 for the vulnerability, the vulnerability metadata 302B is thus adjusted downward to a lower value of 7.5, which may allow other, more severe vulnerabilities to be surfaced (and addressed) before this vulnerability due to them being more of a risk in the particular IT environment.

In some examples, the vulnerability management application 124 itself can identify potential vulnerability context data 230 (e.g., based on visibility into IT environmental context data 212 such as IT asset data 214 and/or activity data 216) and either propose a set of overrides for an analyst to accept, or in some cases, can automatically make the overrides itself (where an analyst may later be able to review these automated overrides). Such options can be used based on the needs or desires of the implementor, and/or made available for users to enable or disable (e.g., via providing IT and security operations application 122 configuration data) based on their particular needs.

As indicated herein, the vulnerability management module 140 can implement a number of correlation searches 246 to attempt to identify and/or enrich vulnerabilities for surfacing via the front-end service 128 interfaces. As disclosed, there are potentially limitless numbers and combinations of logic that can be implemented for this purpose. For the sake of understanding, however, several examples are provided in FIG. 4 that can be used in some examples. In FIG. 4, which illustrates an example set of correlation searches 246 utilized to identify notable vulnerabilities to be presented to users. These example correlation searches 246 are shown in a quasi-SQL (Structured Query Language) type format, though it is to be appreciated that this type of language is merely one form of these searches, and many other types of languages, representations, or logic can be utilized. For example, the searches may be formulated in a language such as the Splunk® Search Processing Language (SPL™) or SPL2, or another language allowing for functionalities such as data searching, filtering, modification, manipulation, insertion, deletion, or the like.

Search 402 is shown as a query seeking ingested vulnerabilities that have not yet been processed (via "PROCESSED=FALSE") that have a "base" CVSS score greater than or equal to a user-configured threshold value (via a USER_RISK_THRESHOLD score from a USER_PREFS, or user preferences, collection or table or similar data structure).

Search 404 is shown as a query seeking ingested, unprocessed vulnerabilities having both a threshold-exceeding CVSS base score as well as one or more assets (e.g., computing resources in the user's IT environment(s)) that correspond to the vulnerability's affected type of asset (e.g., a type of computing device, a type of operating system, a type or version of software).

Further, search 406 is shown as a query seeking those vulnerabilities matching search 404 but also where there is further evidence of certain types of anomalous behavior from any matching asset—here, looking for an observed "recent" (according to some logic) port scan of the asset, a maximum number of failed logins occurrent recently, a recent amount of suspicious inbound network traffic directed to the asset, and/or a recent amount of suspicious outbound network traffic departing the asset.

As another example, search 410 is shown as a query seeking ingested, unprocessed vulnerabilities of a type of "remote code execution" and where an asset exists in the IT environment that is vulnerable to the vulnerability. Example search 412 further constrains search 412 by further requiring that there is at least one affected asset, in the IT environment, that is designated as public facing.

Accordingly, a variety of types of correlation searches 246 can be used at a variety of different scopes for a variety of different purposes to identify vulnerabilities to be surfaced to users. In some examples, vulnerabilities identified as matching a search can be shown, such as via vulnerability workbench 130, with a label or modification indicating that the vulnerability matched a search and optionally indicating which search it matched, which allows an analyst to more quickly understand if and how the vulnerability may be problematic in their IT environment context.

As described herein, the vulnerability management application 124 can provide a number of interfaces to potentially different types of users to provide contextual understanding of vulnerabilities and how they impact particular IT environments. One such interface is a vulnerability dashboard 132, which can provide an overview of the status of vulnerabilities as they affect an IT environment. In some examples, the vulnerability management application 124 can provide one or multiple different types of vulnerability dashboard 132 versions, which may provide different types of information to different types of users, perhaps via use of an RBAC type configuration or user role setting.

Figure 5:
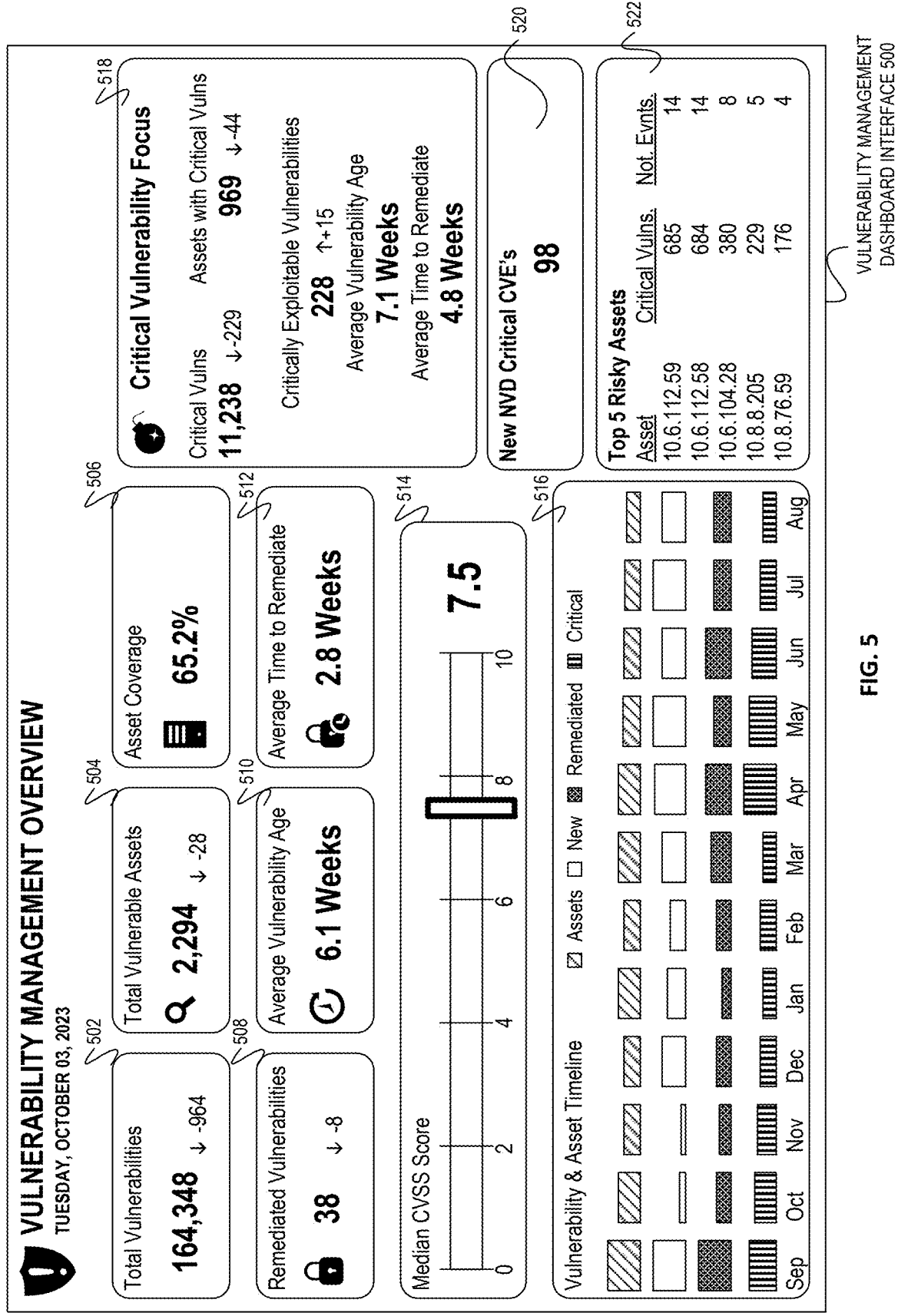
FIG. 5 illustrates an example graphical user interface providing a vulnerability management dashboard displaying contextual IT environment vulnerability information according to some examples.

One type of dashboard is presented in FIG. 5, which illustrates an example graphical user interface 500 providing a vulnerability management dashboard displaying summarized IT environment vulnerability information according to some examples. In some examples, ones of these presented values can be generated via correlation searches described herein or generated based on other types of queries.

In this illustrated example, which may be helpful for an organizational executive type persona (e.g., a CISO) or perhaps a more technical personal (e.g., an analyst), the dashboard interface 500 includes a number of panels (portions, UI elements, etc.) presenting summary information. A first panel 502 illustrates a current number of un-addressed vulnerabilities known for the IT environment, and also shows how that number has changed (as a "delta") over some unit time (e.g., one week, one day, one month, or the like). A second panel 504 shows a total number of vulnerable assets within the IT environment (and the delta), while a third panel 506 displays an asset coverage percentage.

A fourth panel 508 illustrates a number of remediated vulnerabilities (and the change compared to a previous period), while a fifth panel 510 illustrates an average age of non-remediated vulnerabilities and a sixth panel 512 illustrates an average time to remediate.

Additionally, a sixth panel 514 provides a visual display of a median CVSS score, while a seventh panel 516 provides a comparative display of numbers of vulnerabilities and affected assets over time.

The right side of the interface 500 includes a critical vulnerability focus panel 518 providing quick insight into high-priority, or critical, vulnerabilities that exist. This panel 518 shows a count of non-remediated vulnerabilities that are deemed "critical" (with a delta change), a number of assets having critical vulnerabilities (with delta change), a number of critical exploitable vulnerabilities, along with an average critical vulnerability age and an average time to remediate for these critical vulnerabilities.

The interface 500 further includes a panel 520 showing a count of "new" critical vulnerabilities as reported in a particular vulnerability source-here, the NVD database. Finally, the interface 500 includes a panel 522 identifying a "top" number (here, five) of "risky" assets based on a number of critical vulnerabilities associated with the asset, with a table showing, for each asset, an identifier of the asset (here, an IP address, though could also be a hostname, tag, text description, location, or the like), the number of critical un-remediated vulnerabilities associated with the asset, and a number of "notable events" associated with the asset indicative of anomalous activity.

In some examples, users can interact with these UI elements (panels) to view additional information associated with the panel, for example, within a model box or by redirecting the user to a vulnerability workbench 130 type view, which may be configured (e.g., with particular column "sort by" values, or other filters) to show vulnerabilities associated with the panel. As one example, by clicking or otherwise selecting the portion of the critical vulnerability focus panel 518 showing the total number of non-remediated critical vulnerabilities, the display may be updated to show a vulnerability workbench 130 listing all critical vulnerabilities. In this manner, users can proactively and easily seek additional information, perform remediative tasks, etc., in a targeted manner.

Figure 6:
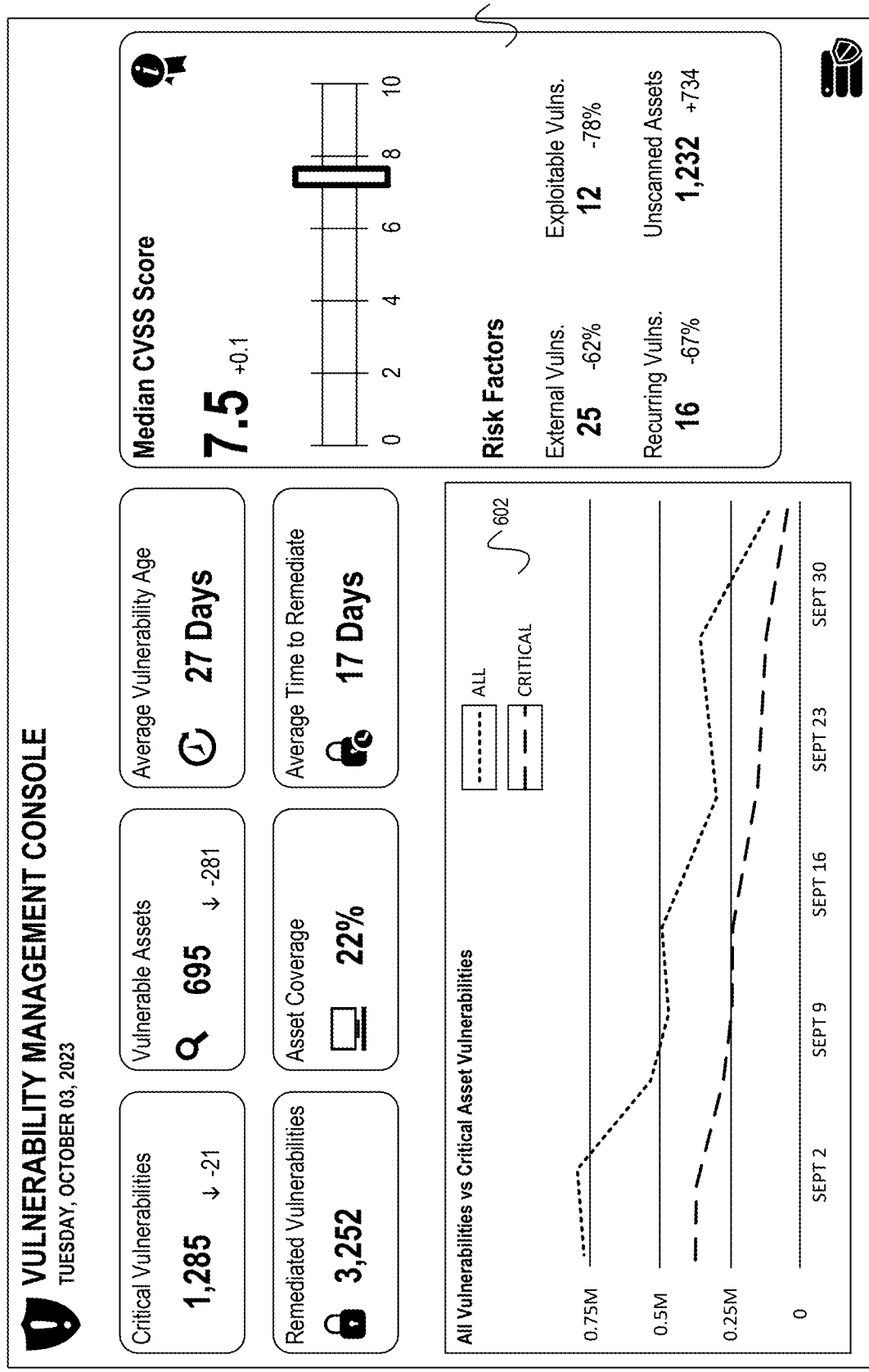
FIG. 6 illustrates another example graphical user interface providing a vulnerability management dashboard displaying contextual IT environment vulnerability information according to some examples.

Another type of vulnerability dashboard 132 is shown in FIG. 6, which illustrates another example graphical user interface 600 providing a vulnerability management dashboard displaying summarized IT environment vulnerability information according to some examples. This dashboard interface 600 provides some similar information to that from FIG. 5 though presented in a different manner, such as counts of critical vulnerabilities (and the change per recent unit time), counts of vulnerable assets (and change), average vulnerability age, counts of remediated vulnerabilities in a recent period of time (and change from the previous period of time), an asset coverage percentage, an average time to remediate, a median risk (CVSS) score, etc. However, this interface 600 also includes a graph portion 602 showing vulnerabilities and critical asset vulnerabilities over time, as well as panel 604 portion showing a set of risk factors including a number of external-facing vulnerabilities (and the delta change), a number of exploitable vulnerabilities (and change), a number of recurring vulnerabilities (and change), and a number of unscanned assets in the IT environment (and delta change). Just like the previous dashboard interface in FIG. 5, these panels in FIG. 6 may likewise be selectable and lead to additional information for use by the user, whether in a modal window, "hover-over" panel, or a redirection to a new page/interface. Similarly, this dashboard view may be provided to particular types of users of an organization, or to all users, etc., based on the needs of the implementor and/or users.

As indicated throughout, the vulnerability management application 124 can also provide a vulnerability workbench 130 to allow users to learn more about vulnerabilities, explore their impacts in the associated IT environment(s), perform or initiate remediative actions, update risk scores, and the like. FIG. 7 illustrates an example graphical user interface 400 providing a vulnerability workbench displaying IT environment-specific vulnerability information according to some examples. In this example, the dashboard interface 700 provides a set of vulnerability records 702A-702X, where each record corresponds to a particular vulnerability. Here, a particular vulnerability record 702 includes values for an identifier (a "CVE ID"), a status of the vulnerability (e.g., new, assigned for remediation, remediation complete, etc.), a base and/or adjust vulnerability risk score (as "Base/Adjusted CVSS"), a severity level, a category or type of the vulnerability, a description, and perhaps many more (or different) field types of vulnerability metadata. A record may also indicate other organizational data, such as an identifier of a user or team assigned to investigate or triage the vulnerability, or a user or team assigned to remediate the risk, or other values. In some examples, vulnerability records can be placed on the vulnerability workbench through a vulnerability being "found" via a correlation search as described herein, though users may also manually add vulnerabilities onto the workbench in some example configurations.

This example interface, for vulnerability records 702, also includes indicators of numbers of assets (or computing resources) in the associated IT environment(s) known to be affected by the vulnerability, a number of these assets designated as being "critical" assets, and zero or more indicators of anomalous asset activity (e.g., as indicated by notable events associated with the asset), such as the existence of "recent" (according to some threshold, such as a fixed prior of time prior to the construction of the interface, or within some window before and/or after the publishing of the vulnerability) anomalous port scans observed, new log-ins or login attempts, atypical egress traffic, atypical ingress traffic, a typical network traffic volume, a typical processing utilization, or the like.

The workbench, in some examples, also allows vulnerability records to be merged. For example, if several vulnerabilities are discovered for a particular operating system or application, these may initially be presented as multiple distinct vulnerability records. In some examples, users can consolidate multiple such records into a single vulnerability record, e.g., by ticking checkboxes (or other UI input elements) associated with these records and then clicking a "merge" type UI input element (e.g., a button).

In some examples, the interface 700 may provide users with user input elements (e.g., clickable links/text, buttons, etc.) that allow the users to sort or filter vulnerability records 702 that are displayed. For example, vulnerability records 702 can be displayed according to recency according to some criteria (e.g., most-recently published vulnerabilities shown first) or displayed in an order (e.g., descending according to base and/or adjusted CVSS risk score such that highest-risk vulnerabilities are shown first) or limited in display (e.g., so that only vulnerabilities of a particular category/class are shown). Moreover, in some examples, the interface 700 can present additional information and/or user input elements upon a user selecting a particular vulnerability record 702, whether via expanding the vulnerability record, generating a popup type menu, a model display, a redirection to a new interface, or the like. For example, the IT environment specific context information (e.g., affected asset count, critical asset count, anomalous activity indicators, etc.) may be shown when a record 702 is expanded.

Figure 8:
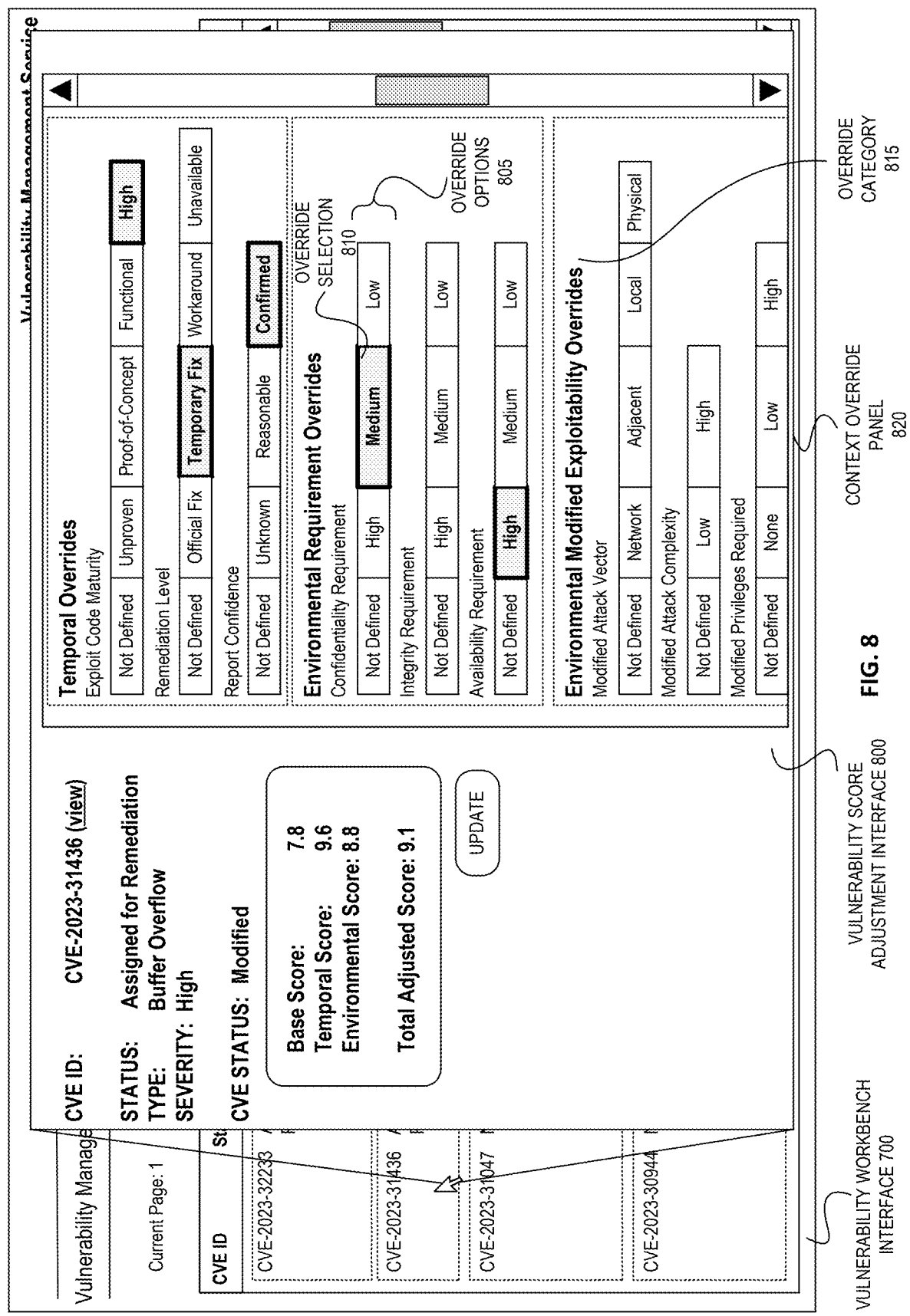
FIG. 8 illustrates an example graphical user interface providing a vulnerability score adjustment interface with an upward user-configurable vulnerability override according to some examples.

For example, FIG. 8 illustrates an example graphical user interface providing a vulnerability score adjustment interface 800 (here, a modal window) with an upward user-configurable vulnerability override according to some examples. As shown, the vulnerability score adjustment interface 800 presents information about the vulnerability (here, a CVE ID, status, type, severity, etc.) along with a context override panel 820 providing user input elements, across one or more categories of overrides 815 (e.g., temporal, environmental, exploitability), allowing a user to provide vulnerability context data 230. In this case, a user has selected some of these user interface input elements (here, buttons), where one or more override options 805 may be provided and a selection 810 is then made from these options. In this example, a user has identified that there is mature exploit code, a temporary fix, and a confirmed report of the vulnerability. This combination of selections leads to a category (temporal) score of 9.6. Additionally, the user has selected values to indicate that the vulnerability, in the context of the associated IT environment(s) under consideration, involve "medium" confidentiality assets having a "high" availability requirement, leading to an environmental score of 8.8. (Note that particular techniques for calculating scores can vary widely, be implemented according to a standard, or the like, as derivable by those of skill in the art.) This combination of vulnerability context data 230 can be used to adjust (or modify) the base vulnerability score-here, from 7.8 to a new value of 9.1.

Another example is shown in FIG. 9, which illustrates an example graphical user interface providing a vulnerability score adjustment interface 900 with a downward user-configurable vulnerability override according to some examples. In this case, a user has provided vulnerability context data 230 for the vulnerability indicating that the involved/affected assets are of low confidentiality, have a low integrity requirement, have a "medium" availability requirement, and as arranged in the IT environment, exploit of the vulnerability would require physical access to work. Accordingly, this context information allows a vulnerability with a base score of 6.4 to be reduced down to only being a 5.1, reflecting that the vulnerability affects systems that are relatively non-vital, and the attack vector is extremely limited as it requires physical access (e.g., the user may know that physical access to the system(s) is well-protected).

As noted, this adjustment is made possible by the disclosed vulnerability management application 124 being able to obtain both vulnerabilities data-potentially of disparate sources—and contextualize it based on IT environmental context data 212, allowing for vulnerability differentiation in that the "noise" of typical vulnerability systems can be greatly reduced by pushing important vulnerabilities to the forefront and allowing not-as-important vulnerabilities to be less prioritized. Moreover, users—or even the system itself—can quickly adjust vulnerabilities based on contextual data, again reducing noise and improving the usefulness of vulnerability data. Further, examples can allow users to begin or trigger vulnerability remediation efforts, such as by assigning vulnerabilities to other users to investigate, implementing some technical protection measures (e.g., changing firewall rules, logging settings, limiting system functionality), sending notifications, and the like.

Additionally, or alternatively, the vulnerability workbench 130 can also provide users with other functionalities. For example, for a particular vulnerability, the vulnerability workbench 130 can interface (e.g., via adaptive response mechanisms) into a Security Orchestration, Automation, and Response (SOAR) type application, such as Splunk® SOAR, which may be part of the same IT and Security Operations Application 122. Thus, in some examples, a user may be able to perform particular operations, via the SOAR application, with regard to the vulnerability, such as through executing security playbooks or other applications. Playbooks broadly represent a tool that security and IT operations teams can use to help develop and execute precise automation strategies within their IT environments. These automation strategies can include intelligence gathering or confirmation tasks (e.g., obtaining more information about affected assets), actively mitigating the impact of ongoing incidents, among many other possible types of processes. Accordingly, users could assign tickets to teams, gather reporting or log type data, perform preprocessing of certain log or security-related information, generating or combining workbench records, prompting remediation teams (e.g., according to a particular timeline, should a vulnerability go unresolved for an amount of time), triggering follow-up security scans, validating findings (e.g., testing if a port is open), or the like.

The vulnerability management application 124 can also provide other useful interfaces in some examples. FIG. 10 illustrates an example graphical user interface 1000 providing Common Vulnerabilities and Exposure (CVE) information according to some examples. As shown, the vulnerability exploration interface 1000 may provide a user interface input element 1020 (here, a search box) allowing a user to search for a particular vulnerability, and specific information, metadata, and the like associated with the vulnerability can be presented to the user. For example, the vulnerability name, description, title, solution(s), age, category, and the like can be presented. Additionally, a risk score (number and/or visual representation), list of exploitability metrics, scope metrics, and/or impact metrics can be shown.

In some configurations, contextual information can also be displayed. As shown here in an affected asset panel 1010, one or more user interface elements (here, a drop down box) can list affected vulnerability assets from the associated IT environment(s), which may have been identified as part of vulnerability scan data, by identifying assets (e.g., by matching vulnerability metadata, such as an affected system type, with asset metadata, such as an indicator of what type of system each asset is), or the like.

As shown, the vulnerability exploration interface 1000 may also include a user interface input element 1024 allowing the user to add the vulnerability to the vulnerability workbench. This could be particularly useful such as when the user has searched for a vulnerability that is currently unknown or unobserved to the IT environment, and the system is able to retrieve this vulnerability from a vulnerability data source. Upon user review, if the vulnerability is likely applicable to the user's environment, they can simply add it to the workbench for subsequent management.

FIG. 11 is a flowchart illustrating operations of an example process 1100 for localized vulnerability score modification according to some examples. The example process 1100 can be implemented, for example, by one or more computing devices each comprising one or more processors and a non-transitory computer-readable medium. The non-transitory computer readable medium can store instructions which, when executed by the one or more processors, can cause the one or more processors to perform the operations of the illustrated process 1100. Alternatively, or additionally, the process 1100 can be implemented using a non-transitory computer-readable medium storing instructions that, when executed by one or more processors, cause the one or more processors to perform the operations of the process 1100 of FIG. 1100.

The process 1100 includes, at block 1102, obtaining, by an enterprise security application, a vulnerability report generated by a vulnerability scanner, wherein the vulnerability report is indicative of a detected vulnerability associated with a computing resource utilized within an information technology (IT) environment. In some examples, the obtaining of the vulnerability report may be performed by a data intake and query system or other component of an IT and security operations application, and this vulnerability report (in whole or in part) can be provided or otherwise made available to the enterprise security application for analysis, processing, or the like.

At block 1104, the process 1100 includes identifying, by the enterprise security application via a security information and event management (SIEM) data store, one or more of asset data or activity data of the IT environment associated with the computing resource.

The process 1100 further includes, at block 1106, causing display, by the enterprise security application, of a graphical user interface (GUI) indicative of the vulnerability and identifying the asset data or activity data.

At block 1108, the process 1100 includes modifying a risk score associated with the vulnerability.

In some examples, the process 1100 further includes identifying a type of the vulnerability scanner used to generate the vulnerability report; and normalizing data of the vulnerability report, based on the identified type, via use of a common data model.

In some examples, obtaining the vulnerability report comprises retrieving the vulnerability report from a third-party computing system, wherein the third-party is a developer or publisher of the vulnerability scanner.

In some examples, the process 1100 further includes causing a user interface (UI) input element to be presented that allows a user to provide a temporal or environmental override value associated with the vulnerability or the computing resource; and receiving a user input providing the override value, wherein the modifying of the risk score is based at least in part on the override value.

In some examples, the modifying of the risk score is further based at least in part on a vulnerability score provided with the vulnerability report.

In some examples, the user input indicates that the override value is to be further used to modify risk scores associated with vulnerabilities of other computing resources.

In some examples, the modifying of the risk score occurs based at least in part on use of the asset data or the activity data.

In some examples, the identifying comprises identifying activity data associated with the computing resource, wherein the activity data comprises or is based on network traffic observed directed to the computing resource or originated by the computing resource.

In some examples, the process 1100 further includes obtaining a second vulnerability report published by a third party indicative of a second vulnerability; determining, by the enterprise security application based on other asset data of the IT environment via the SIEM data store, that the second vulnerability is likely associated with one or more other computing resources of the IT environment; and causing display of a second GUI to present the second vulnerability and identify the one or more other computing resources of the IT environment.

In some examples, the process 1100 further includes causing display of a UI input element allowing for user input that assigns the vulnerability to an other user or account to be investigated; and associating the vulnerability with the other user or account.

In some examples, the process 1100 further includes prior to the modifying of the risk score, causing display of a dashboard GUI identifying a number of critically exploitable vulnerabilities associated with the IT environment; and after the modifying of the risk score, causing the display of the dashboard GUI to identify a different number of critically exploitable vulnerabilities associated with the IT environment.

Entities of various types, such as companies, educational institutions, medical facilities, governmental departments, and private individuals, among other examples, operate computing environments for various purposes. Computing environments, which can also be referred to as IT environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively, or additionally, the operator of the data center may provide the computing resources to users associated with other entities, for example on a subscription basis. In both of these examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, a data intake and query system can enable an entity to use the data for administration of the computing environment, to detect security issues, to understand how the computing environment is performing or being used, and/or to perform other analytics.

Figure 12:
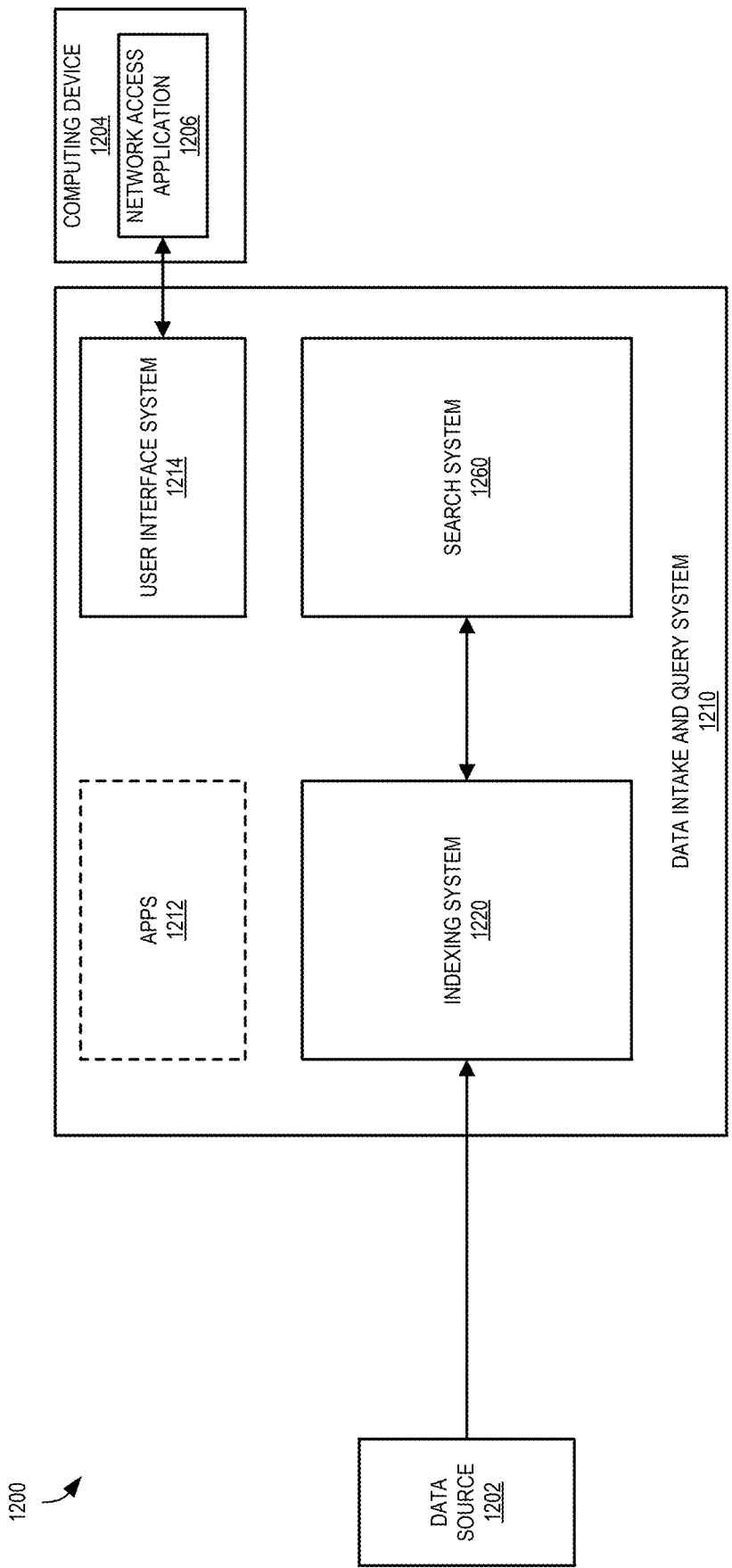
FIG. 12 is a block diagram illustrating an example computing environment that includes a data intake and query system according to some examples.

FIG. 12 is a block diagram illustrating an example computing environment 1200 that includes a data intake and query system 1210. The data intake and query system 1210 obtains data from a data source 1202 in the computing environment 1200, and ingests the data using an indexing system 1220. A search system 1260 of the data intake and query system 1210 enables users to navigate the indexed data. Though drawn with separate boxes, in some implementations the indexing system 1220 and the search system 1260 can have overlapping components. A computing device 1204, running a network access application 1206, can communicate with the data intake and query system 1210 through a user interface system 1214 of the data intake and query system 1210. Using the computing device 1204, a user can perform various operations with respect to the data intake and query system 1210, such as administration of the data intake and query system 1210, management and generation of "knowledge objects," initiating of searches, and generation of reports, among other operations. The data intake and query system 1210 can further optionally include apps 1212 that extend the search, analytics, and/or visualization capabilities of the data intake and query system 1210.

The data intake and query system 1210 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 1210 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 1210 can execute on a single computing device, or may be distributed over multiple computing devices. For example, the program code can include instructions for executing both indexing and search components (which may be part of the indexing system 1220 and/or the search system 1260, respectively), and can be executed on a computing device that also provides the data source 1202. As another example, the program code can execute on one computing device, where the program code executes both indexing and search components, while another copy of the program code executes on a second computing device that provides the data source 1202. As another example, the program code can execute only an indexing component or only a search component. In this example, a first instance of the program code that is executing the indexing component and a second instance of the program code that is executing the search component can be executing on the same computing device or on different computing devices.

The data source 1202 of the computing environment 1200 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred as a hypervisor), a container, or a container orchestrator, among other examples. Examples of computing devices that can provide the data source 1202 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 1220 obtains machine date from the data source 1202 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 1220 does not require prior knowledge of the structure of incoming data (e.g., the indexing system 1220 does not need to be provided with a schema describing the data). Additionally, the indexing system 1220 retains a copy of the data as it was received by the indexing system 1220 such that the original data is always available for searching (e.g., no data is discarded, though, in some examples, the indexing system 1220 can be configured to do so).

The search system 1260 searches the data stored by the indexing 1220 system. As discussed in greater detail below, the search system 1260 enables users associated with the computing environment 1200 (and possibly also other users) to navigate the data, generate reports, and visualize results in "dashboards" output using a graphical interface. Using the facilities of the search system 1260, users can obtain insights about the data, such as retrieving events from an index, calculating metrics, searching for specific conditions within a rolling time window, identifying patterns in the data, and predicting future trends, among other examples. To achieve greater efficiency, the search system 1260 can apply map-reduce methods to parallelize searching of large volumes of data. Additionally, because the original data is available, the search system 1260 can apply a schema to the data at search time. This allows different structures to be applied to the same data, or for the structure to be modified if or when the content of the data changes. Application of a schema at search time may be referred to herein as a late-binding schema technique.

The user interface system 1214 provides mechanisms through which users associated with the computing environment 1200 (and possibly others) can interact with the data intake and query system 1210. These interactions can include configuration, administration, and management of the indexing system 1220, initiation and/or scheduling of queries to the search system 1260, receipt or reporting of search results, and/or visualization of search results. The user interface system 1214 can include, for example, facilities to provide a command line interface or a web-based interface.

Users can access the user interface system 1214 using a computing device 1204 that communicates with data intake and query system 1210, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 1200. For example, a person can log in as a particular user and, using the user's digital information, can access the data intake and query system 1210. A user can be associated with one or more people, meaning that one or more people may be able to use the same user's digital information. For example, an administrative user account may be used by multiple people who have been given access to the administrative user account. Alternatively, or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 1204 can provide a human-machine interface through which a person can have a digital presence in the computing environment 1200 in the form of a user. The computing device 1204 is an electronic device having one or more processors and a memory capable of storing instructions for execution by the one or more processors. The computing device 1204 can further include input/output (I/O) hardware and a network interface. Applications executed by the computing device 1204 can include a network access application 1206, which can a network interface of the client computing device 1204 to communicate, over a network, with the user interface system 1214 of the data intake and query system 1210. The user interface system 1214 can use the network access application 1206 to generate user interfaces that enable a user to interact with the data intake and query system 1210. A web browser is one example of a network access application. A shell tool can also be used as a network access application. In some examples, the data intake and query system 1210 is an application executed on the computing device. In such examples, the network access application 1206 can access the user interface system 1214 without needing to go over a network.

The data intake and query system 1210 can optionally include apps 1212. An app of the data intake and query system 1210 is a collection of configurations, knowledge objects (a user-defined entity that enriches the data in the data intake and query system 1210), views, and dashboards that may provide additional functionality, different techniques for searching the data, and/or additional insights into the data. The data intake and query system 1210 can execute multiple applications simultaneously. Example applications include an IT service intelligence application, which can monitor and analyze the performance and behavior of the computing environment 1200, and an enterprise security application, which can include content and searches to assist security analysts in diagnosing and acting on anomalous or malicious behavior in the computing environment 1200.

Though FIG. 12 illustrates only one data source, in practical implementations, the computing environment 1200 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of computing environment 1200, the data intake and query system 1210 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud and has digital access to resources provided by the computing devices only to the extent that such access is enabled by the provider entity.

In some implementations, the computing environment 1200 can include on-prem and cloud-based computing resources, or only cloud-based resources. For example, an entity may have on-prem computing devices and a private cloud. In this example, the entity operates the data intake and query system 1210 and can choose to execute the data intake and query system 1210 on an on-prem computing device or in the cloud. In another example, a provider entity operates the data intake and query system 1210 in a public cloud and provides the functionality of the data intake and query system 1210 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 1210. In some implementations, the entity providing the data intake and query system 1210 is itself subscribing to the cloud services of a cloud service provider. As an example, a first entity provides computing resources under a public cloud service model, a second entity subscribes to the cloud services of the first provider entity and uses the cloud computing resources to operate the data intake and query system 1210, and a third entity can subscribe to the services of the second provider entity to use the functionality of the data intake and query system 1210. In this example, the data sources are associated with the third entity, users accessing the data intake and query system 1210 are associated with the third entity, and the analytics and insights provided by the data intake and query system 1210 are for purposes of the third entity's operations.

Figure 13:
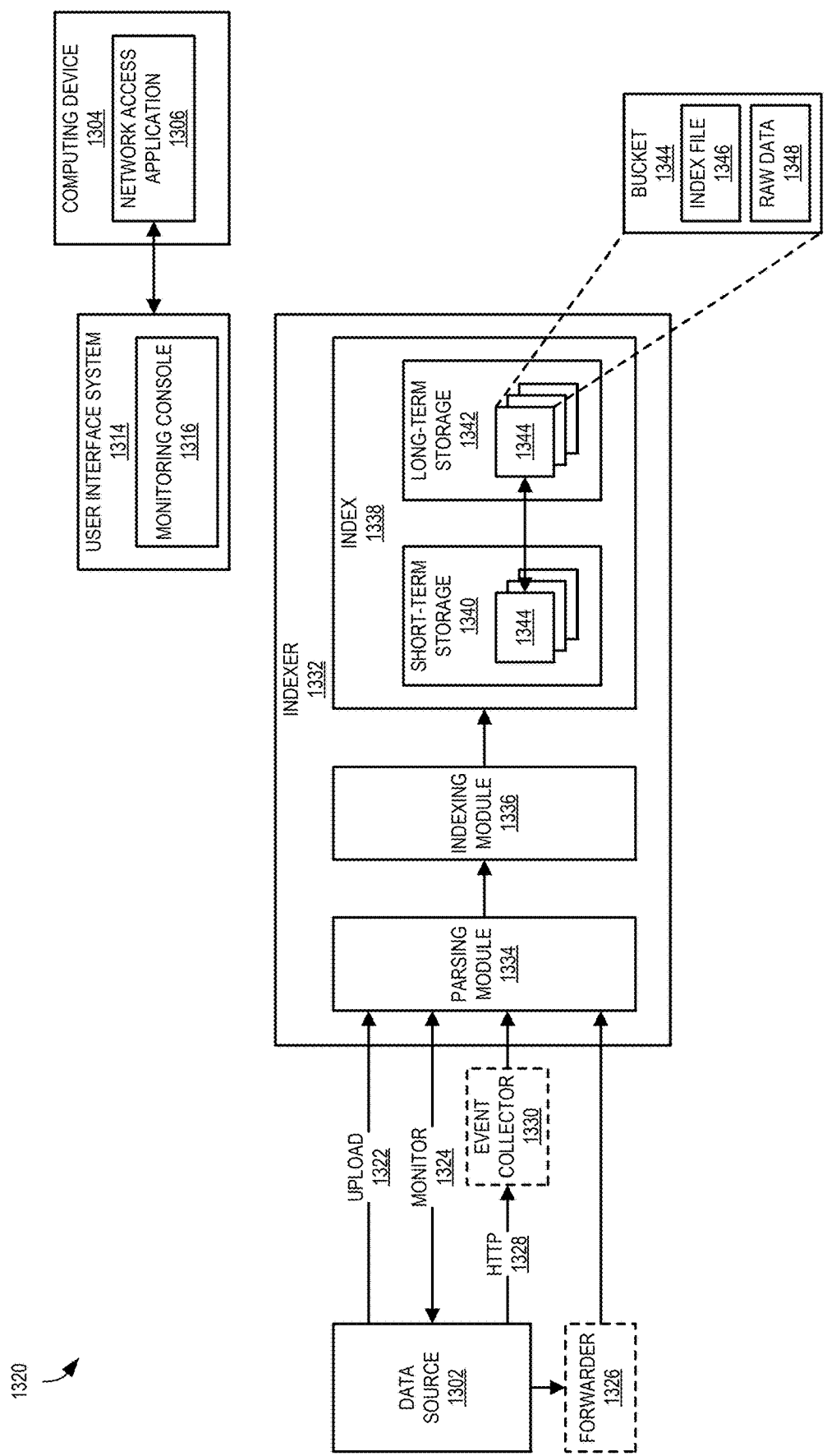
FIG. 13 is a block diagram illustrating in greater detail an example of an indexing system of a data intake and query system according to some examples.

FIG. 13 is a block diagram illustrating in greater detail an example of an indexing system 1320 of a data intake and query system, such as the data intake and query system 1210 of FIG. 12. The indexing system 1320 of FIG. 13 uses various methods to obtain machine data from a data source 1302 and stores the data in an index 1338 of an indexer 1332. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 1320 enables the data intake and query system to obtain the machine data produced by the data source 1302 and to store the data for searching and retrieval.

Users can administer the operations of the indexing system 1320 using a computing device 1304 that can access the indexing system 1320 through a user interface system 1314 of the data intake and query system. For example, the computing device 1304 can be executing a network access application 1306, such as a web browser or a terminal, through which a user can access a monitoring console 1316 provided by the user interface system 1314. The monitoring console 1316 can enable operations such as: identifying the data source 1302 for indexing; configuring the indexer 1332 to index the data from the data source 1302; configuring a data ingestion method; configuring, deploying, and managing clusters of indexers; and viewing the topology and performance of a deployment of the data intake and query system, among other operations. The operations performed by the indexing system 1320 may be referred to as "index time" operations, which are distinct from "search time" operations that are discussed further below.

The indexer 1332, which may be referred to herein as a data indexing component, coordinates and performs most of the index time operations. The indexer 1332 can be implemented using program code that can be executed on a computing device. The program code for the indexer 1332 can be stored on a non-transitory computer-readable medium (e.g. a magnetic, optical, or solid-state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 1332. In some implementations, the indexer 1332 executes on the computing device 1304 through which a user can access the indexing system 1320. In some implementations, the indexer 1332 executes on a different computing device.

The indexer 1332 may be executing on the computing device that also provides the data source 1302 or may be executing on a different computing device. In implementations wherein the indexer 1332 is on the same computing device as the data source 1302, the data produced by the data source 1302 may be referred to as "local data." In other implementations the data source 1302 is a component of a first computing device and the indexer 1332 executes on a second computing device that is different from the first computing device. In these implementations, the data produced by the data source 1302 may be referred to as "remote data." In some implementations, the first computing device is "on-prem" and in some implementations the first computing device is "in the cloud." In some implementations, the indexer 1332 executes on a computing device in the cloud and the operations of the indexer 1332 are provided as a service to entities that subscribe to the services provided by the data intake and query system.

For a given data produced by the data source 1302, the indexing system 1320 can be configured to use one of several methods to ingest the data into the indexer 1332. These methods include upload 1322, monitor 1324, using a forwarder 1326, or using HTTP 1328 and an event collector 1330. These and other methods for data ingestion may be referred to as "getting data in" (GDI) methods.

Using the upload 1322 method, a user can instruct the indexing system to 1302 to specify a file for uploading into the indexer 1332. For example, the monitoring console 1316 can include commands or an interface through which the user can specify where the file is located (e.g., on which computing device and/or in which directory of a file system) and the name of the file. Once uploading is initiated, the indexer 1332 processes the file, as discussed further below. Uploading is a manual process and occurs when instigated by a user. For automated data ingestion, the other ingestion methods are used.

The monitor 1324 method enables the indexing system to monitor the data source 1302 and continuously or periodically obtain data produced by the data source 1302 for ingestion by the indexer 1332. For example, using the monitoring console 1316, a user can specify a file or directory for monitoring. In this example, the indexing system can execute a monitoring process that detects whenever data is added to the file or directory and causes the data to be sent to the indexer 1332. As another example, a user can specify a network port for monitoring. In this example, a monitoring process can capture data received at or transmitting from the network port and cause the data to be sent to the indexer 1332. In various examples, monitoring can also be configured for data sources such as operating system event logs, performance data generated by an operating system, operating system registries, operating system directory services, and other data sources.

Monitoring is available when the data source 1302 is local to the indexer 1332 (e.g., the data source 1302 is on the computing device where the indexer 1332 is executing). Other data ingestion methods, including forwarding and the event collector 1330, can be used for either local or remote data sources.

A forwarder 1326, which may be referred to herein as a data forwarding component, is a software process that sends data from the data source 1302 to the indexer 1332. The forwarder 1326 can be implemented using program code that can be executed on the computer device that provides the data source 1302. A user launches the program code for the forwarder 1326 on the computing device that provides the data source 1302. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 1326 can provide various capabilities. For example, the forwarder 1326 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 1326 can break the data into individual events (event generation is discussed further below) and send the events to a receiver. Other operations that the forwarder 1326 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 1330 provides an alternate method for obtaining data from the data source 1302. The event collector 1330 enables data and application events to be sent to the indexer 1332 using HTTP 1328. The event collector 1330 can be implemented using program code that can be executing on a computing device. The program code may be a component of the data intake and query system or can be a standalone component that can be executed independently of the data intake and query system and operates in cooperation with the data intake and query system.

To use the event collector 1330, a user can, for example using the monitoring console 1316 or a similar interface provided by the user interface system 1314, enable the event collector 1330 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 1302 as an alternative method to using a username and password for authentication.

To send data to the event collector 1330, the data source 1302 is supplied with a token and can then send HTTP 1328 requests to the event collector 1330. To send HTTP 1328 requests, the data source 1302 can be configured to use an HTTP client and/or to use logging libraries such as those supplied by Java, JavaScript, and .NET libraries. An HTTP client enables the data source 1302 to send data to the event collector 1330 by supplying the data, and a Uniform Resource Identifier (URI) for the event collector 1330 to the HTTP client. The HTTP client then handles establishing a connection with the event collector 1330, transmitting a request containing the data, closing the connection, and receiving an acknowledgment if the event collector 1330 sends one. Logging libraries enable HTTP 1328 requests to the event collector 1330 to be generated directly by the data source. For example, an application can include or link a logging library, and through functionality provided by the logging library manage establishing a connection with the event collector 1330, transmitting a request, and receiving an acknowledgement.

An HTTP 1328 request to the event collector 1330 can contain a token, a channel identifier, event metadata, and/or event data. The token authenticates the request with the event collector 1330. The channel identifier, if available in the indexing system 1320, enables the event collector 1330 to segregate and keep separate data from different data sources. The event metadata can include one or more key-value pairs that describe the data source 1302 or the event data included in the request. For example, the event metadata can include key-value pairs specifying a timestamp, a hostname, a source, a source type, or an index where the event data should be indexed. The event data can be a structured data object, such as a JavaScript Object Notation (JSON) object, or raw text. The structured data object can include both event data and event metadata. Additionally, one request can include event data for one or more events.

In some implementations, the event collector 1330 extracts events from HTTP 1328 requests and sends the events to the indexer 1332. The event collector 1330 can further be configured to send events or event data to one or more indexers. Extracting the events can include associating any metadata in a request with the event or events included in the request. In these implementations, event generation by the indexer 1332 (discussed further below) is bypassed, and the indexer 1332 moves the events directly to indexing. In some implementations, the event collector 1330 extracts event data from a request and outputs the event data to the indexer 1332, and the indexer generates events from the event data. In some implementations, the event collector 1330 sends an acknowledgement message to the data source 1302 to indicate that the event collector 1330 has received a particular request form the data source 1302, and/or to indicate to the data source 1302 that events in the request have been added to an index.

The indexer 1332 ingests incoming data and transforms the data into searchable knowledge in the form of events. In the data intake and query system, an event is a single piece of data that represents activity of the component represented in FIG. 13 by the data source 1302. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 1332 can include a parsing module 1334 and an indexing module 1336 for generating and storing the events. The parsing module 1334 and indexing module 1336 can be modular and pipelined, such that one component can be operating on a first set of data while the second component is simultaneously operating on a second sent of data. Additionally, the indexer 1332 may at any time have multiple instances of the parsing module 1334 and indexing module 1336, with each set of instances configured to simultaneously operate on data from the same data source or from different data sources. The parsing module 1334 and indexing module 1336 are illustrated to facilitate discussion, with the understanding that implementations with other components are possible to achieve the same functionality.

The parsing module 1334 determines information about event data, where the information can be used to identify events within the event data. For example, the parsing module 1334 can associate a source type with the event data. A source type identifies the data source 1302 and describes a possible data structure of event data produced by the data source 1302. For example, the source type can indicate which fields to expect in events generated at the data source 1302 and the keys for the values in the fields, and possibly other information such as sizes of fields, an order of the fields, a field separator, and so on. The source type of the data source 1302 can be specified when the data source 1302 is configured as a source of event data. Alternatively, the parsing module 1334 can determine the source type from the event data, for example from an event field or using machine learning.

Other information that the parsing module 1334 can determine includes timestamps. In some cases, an event includes a timestamp as a field, and the timestamp indicates a point in time when the action represented by the event occurred or was recorded by the data source 1302 as event data. In these cases, the parsing module 1334 may be able to determine from the source type associated with the event data that the timestamps can be extracted from the events themselves. In some cases, an event does not include a timestamp and the parsing module 1334 determines a timestamp for the event, for example from a name associated with the event data from the data source 1302 (e.g., a file name when the event data is in the form of a file) or a time associated with the event data (e.g., a file modification time). As another example, when the parsing module 1334 is not able to determine a timestamp from the event data, the parsing module 1334 may use the time at which it is indexing the event data. As another example, the parsing module 1334 can use a user-configured rule to determine the timestamps to associate with events.

The parsing module 1334 can further determine event boundaries. In some cases, a single line (e.g., a sequence of characters ending with a line termination) in event data represents one event while in other cases, a single line represents multiple events. In yet other cases, one event may span multiple lines within the event data. The parsing module 1334 may be able to determine event boundaries from the source type associated with the event data, for example from a data structure indicated by the source type. In some implementations, a user can configure rules the parsing module 1334 can use to identify event boundaries.

The parsing module 1334 can further extract data from events and possibly also perform transformations on the events. For example, the parsing module 1334 can extract a set of fields for each event, such as a host or hostname, source or source name, and/or source type. The parsing module 1334 may extract certain fields by default or based on a user configuration. Alternatively or additionally, the parsing module 1334 may add fields to events, such as a source type or a user-configured field. As another example of a transformation, the parsing module 1334 can anonymize fields in events to mask sensitive information, such as social security numbers or account numbers. Anonymizing fields can include changing or replacing values of specific fields. The parsing component 1334 can further perform user-configured transformations.

The parsing module 1334 outputs the results of processing incoming event data to the indexing module 1336, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 1332 can be configured to identify searchable segments that are parts of fields, searchable segments that are entire fields, or both. The parsing module 1334 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 1346, to find event data that matches a search query. In some implementations, segmentation can alternatively be performed by the forwarder 1326. Segmentation can also be disabled, in which case the indexer 1332 will not build a lexicon for the event data. When segmentation is disabled, the search system searches the event data directly.

Building index data structures generates the index 1338. The index 1338 is a storage data structure on a storage device (e.g., a disk drive or other physical device for storing digital data). The storage device may be a component of the computing device on which the indexer 1332 is operating (referred to herein as local storage) or may be a component of a different computing device (referred to herein as remote storage) that the index 1338 has access to over a network. The indexer 1332 can include more than one index and can include indexes of different types. For example, the indexer 1332 can include event indexes, which impose minimal structure on stored data and can accommodate any type of data. As another example, the indexer 1332 can include metrics indexes, which use a highly structured format to handle the higher volume and lower latency demands associated with metrics data.

The indexing module 1336 organizes files in the index 1338 in directories referred to as buckets. The files in a bucket 1344 can include raw data files, index files, and possibly also other metadata files. As used herein, "raw data" means data as when the data was produced by the data source 1302, without alteration to the format or content. As noted previously, the parsing component 1334 may add fields to event data and/or perform transformations on fields in the event data, and thus a raw data file 1348 can include, in addition to or instead of raw data, what is referred to herein as enriched raw data. The raw data file 1348 may be compressed to reduce disk usage. An index file 1346, which may also be referred to herein as a "time-series index" or tsidx file, contains metadata that the indexer 1332 can use to search a corresponding raw data file 1348. As noted above, the metadata in the index file 1346 includes a lexicon of the event data, which associates each unique keyword in the event data in the raw data file 1348 with a reference to the location of event data within the raw data file 1348. The keyword data in the index file 1346 may also be referred to as an inverted index. In various implementations, the data intake and query system can use index files for other purposes, such as to store data summarizations that can be used to accelerate searches.

A bucket 1344 includes event data for a particular range of time. The indexing module 1336 arranges buckets in the index 1338 according to the age of the buckets, such that buckets for more recent ranges of time are stored in short-term storage 1340 and buckets for less recent ranges of time are stored in long-term storage 1342. Short-term storage 1340 may be faster to access while long-term storage 1342 may be slower to access. Buckets may move from short-term storage 1340 to long-term storage 1342 according to a configurable data retention policy, which can indicate at what point in time a bucket is old enough to be moved.

A bucket's location in short-term storage 1340 or long-term storage 1342 can also be indicated by the bucket's status. As an example, a bucket's status can be "hot," "warm," "cold," "frozen," or "thawed." In this example, hot bucket is one to which the indexer 1332 is writing data and the bucket becomes a warm bucket when the index 1338 stops writing data to it. In this example, both hot and warm buckets reside in short-term storage 1340. Continuing this example, when a warm bucket is moved to long-term storage 1342, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 1320 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each buckets must exist within the cluster), and indexers to which buckets are copied may be selected to optimize distribution of data across the cluster.

A user can view the performance of the indexing system 1320 through the monitoring console 1316 provided by the user interface system 1314. Using the monitoring console 1316, the user can configure and monitor an index cluster, and see information such as disk usage by an index, volume usage by an indexer, index and volume size over time, data age, statistics for bucket types, and bucket settings, among other information.

Figure 14:
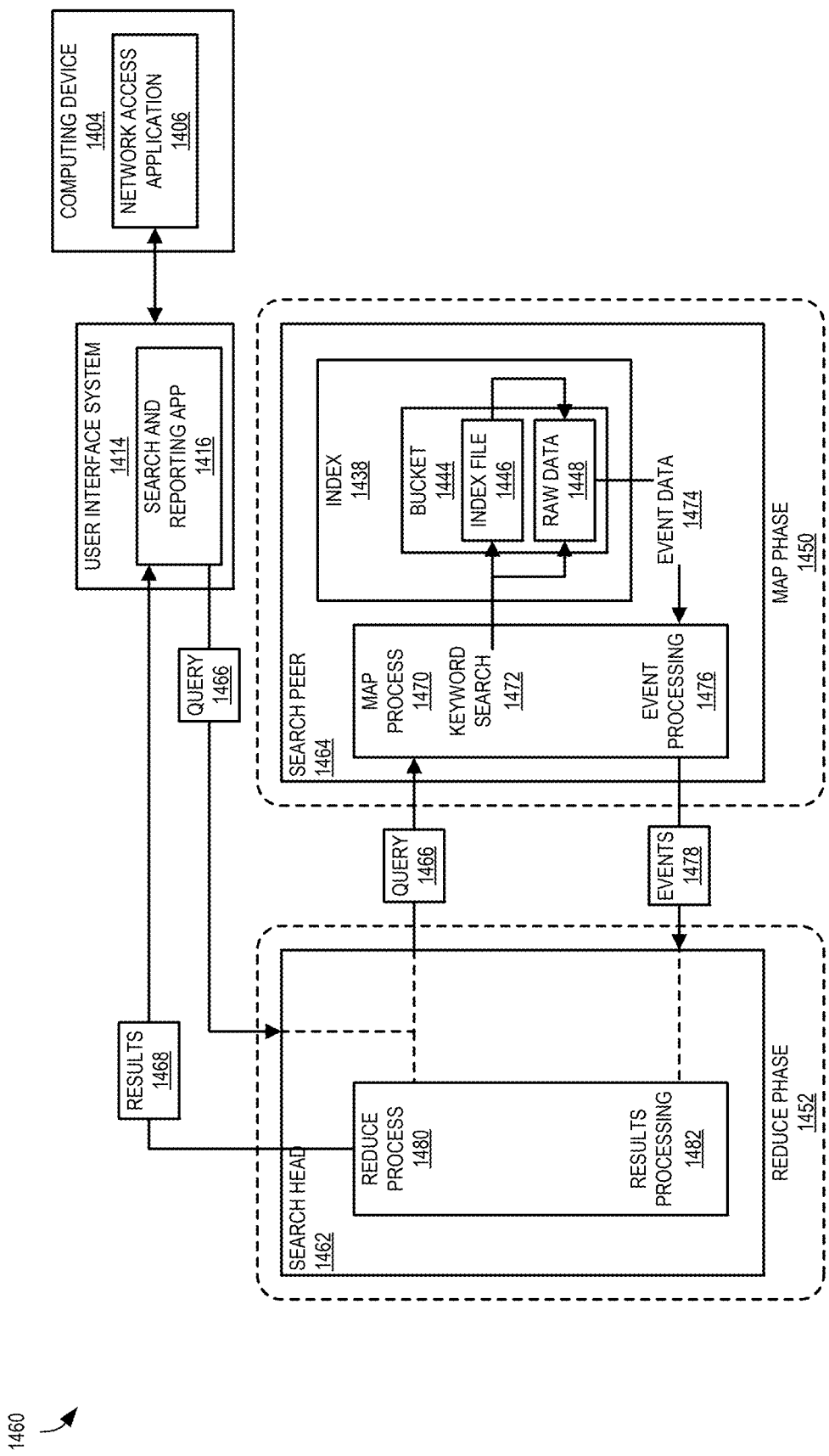
FIG. 14 is a block diagram illustrating in greater detail an example of the search system of a data intake and query system according to some examples.

FIG. 14 is a block diagram illustrating in greater detail an example of the search system 1460 of a data intake and query system, such as the data intake and query system 1210 of FIG. 12. The search system 1460 of FIG. 14 issues a query 1466 to a search head 1462, which sends the query 1466 to a search peer 1464. Using a map process 1470, the search peer 1464 searches the appropriate index 1438 for events identified by the query 1466 and sends events 1478 so identified back to the search head 1462. Using a reduce process 1482, the search head 1462 processes the events 1478 and produces results 1468 to respond to the query 1466. The results 1468 can provide useful insights about the data stored in the index 1438. These insights can aid in the administration of information technology systems, in security analysis of information technology systems, and/or in analysis of the development environment provided by information technology systems.

The query 1466 that initiates a search is produced by a search and reporting app 1416 that is available through the user interface system 1414 of the data intake and query system. Using a network access application 1406 executing on a computing device 1404, a user can input the query 1466 into a search field provided by the search and reporting app 1416. Alternatively or additionally, the search and reporting app 1416 can include pre-configured queries or stored queries that can be activated by the user. In some cases, the search and reporting app 1416 initiates the query 1466 when the user enters the query 1466. In these cases, the query 1466 may be referred to as an "ad-hoc" query. In some cases, the search and reporting app 1416 initiates the query 1466 based on a schedule. For example, the search and reporting app 1416 can be configured to execute the query 1466 once per hour, once per day, at a specific time, on a specific date, or at some other time that can be specified by a date, time, and/or frequency. These types of queries may be referred to as scheduled queries.

The query 1466 is specified using a search processing language. The search processing language includes commands that the search peer 1464 will use to identify events to return in the search results 1468. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 1466 to include sequential commands, where a subsequent command may operate on the results of a prior command. As an example, sequential commands may be separated in the query 1466 by a vertical line ("|" or "pipe") symbol.

In addition to one or more search commands, the query 1466 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 1466 occurs in two broad phases: a map phase 1450 and a reduce phase 1452. The map phase 1450 takes place across one or more search peers. In the map phase 1450, the search peers locate event data that matches the search terms in the search query 1466 and sorts the event data into field-value pairs. When the map phase 1450 is complete, the search peers send events that they have found to one or more search heads for the reduce phase 1452. During the reduce phase 1452, the search heads process the events through commands in the search query 1466 and aggregate the events to produce the final search results 1468.

A search head, such as the search head 1462 illustrated in FIG. 14, is a component of the search system 1460 that manages searches. The search head 1462, which may also be referred to herein as a search management component, can be implemented using program code that can be executed on a computing device. The program code for the search head 1462 can be stored on a non-transitory computer-readable medium and from this medium can be loaded or copied to the memory of a computing device. One or more hardware processors of the computing device can read the program code from the memory and execute the program code in order to implement the operations of the search head 1462.

Upon receiving the search query 1466, the search head 1462 directs the query 1466 to one or more search peers, such as the search peer 1464 illustrated in FIG. 14. "Search peer" is an alternate name for "indexer" and a search peer may be largely similar to the indexer described previously. The search peer 1464 may be referred to as a "peer node" when the search peer 1464 is part of an indexer cluster. The search peer 1464, which may also be referred to as a search execution component, can be implemented using program code that can be executed on a computing device. In some implementations, one set of program code implements both the search head 1462 and the search peer 1464 such that the search head 1462 and the search peer 1464 form one component. In some implementations, the search head 1462 is an independent piece of code that performs searching and no indexing functionality. In these implementations, the search head 1462 may be referred to as a dedicated search head.

The search head 1462 may consider multiple criteria when determining whether to send the query 1466 to the particular search peer 1464. For example, the search system 1460 may be configured to include multiple search peers that each have duplicative copies of at least some of the event data. In this example, the sending the search query 1466 to more than one search peer allows the search system 1460 to distribute the search workload across different hardware resources. As another example, search system 1460 may include different search peers for different purposes (e.g., one has an index storing a first type of data or from a first data source while a second has an index storing a second type of data or from a second data source). In this example, the search query 1466 may specify which indexes to search, and the search head 1462 will send the query 1466 to the search peers that have those indexes.

To identify events 1478 to send back to the search head 1462, the search peer 1464 performs a map process 1470 to obtain event data 1474 from the index 1438 that is maintained by the search peer 1464. During a first phase of the map process 1470, the search peer 1464 identifies buckets that have events that are described by the time indicator in the search query 1466. As noted above, a bucket contains events whose timestamps fall within a particular range of time. For each bucket 1444 whose events can be described by the time indicator, during a second phase of the map process 1470, the search peer 1464 performs a keyword search 1472 using search terms specified in the search query 1466. The search terms can be one or more of keywords, phrases, fields, Boolean expressions, and/or comparison expressions that in combination describe events being searched for. When segmentation is enabled at index time, the search peer 1464 performs the keyword search 1472 on the bucket's index file 1446. As noted previously, the index file 1446 includes a lexicon of the searchable terms in the events stored in the bucket's raw data 1448 file. The keyword search 1472 searches the lexicon for searchable terms that correspond to one or more of the search terms in the query 1466. As also noted above, the lexicon incudes, for each searchable term, a reference to each location in the raw data 1448 file where the searchable term can be found. Thus, when the keyword search identifies a searchable term in the index file 1446 that matches query 1466, the search peer 1464 can use the location references to extract from the raw data 1448 file the event data 1474 for each event that include the searchable term.

In cases where segmentation was disabled at index time, the search peer 1464 performs the keyword search 1472 directly on the raw data 1448 file. To search the raw data 1448, the search peer 1464 may identify searchable segments in events in a similar manner as when the data was indexed. Thus, depending on how the search peer 1464 is configured, the search peer 1464 may look at event fields and/or parts of event fields to determine whether an event matches the query 1466. Any matching events can be added to the event data 1474 read from the raw data 1448 file. The search peer 1464 can further be configured to enable segmentation at search time, so that searching of the index 1438 causes the search peer 1464 to build a lexicon in the index file 1446.

The event data 1474 obtained from the raw data 1448 file includes the full text of each event found by the keyword search 1472. During a third phase of the map process 1470, the search peer 1464 performs event processing 1476 on the event data 1474, with the steps performed being determined by the configuration of the search peer 1464 and/or commands in the search query 1466. For example, the search peer 1464 can be configured to perform field discovery and field extraction. Field discovery is a process by which the search peer 1464 identifies and extracts key-value pairs from the events in the event data 1474. The search peer 1464 can, for example, be configured to automatically extract the first one-hundred fields (or another number of fields) in the event data 1474 that can be identified as key-value pairs. As another example, the search peer 1464 can extract any fields explicitly mentioned in the search query 1466. The search peer 1464 can, alternatively or additionally, be configured with particular field extractions to perform.

Other examples of steps that can be performed during event processing 1476 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 1464 sends processed events 1478 to the search head 1462, which performs a reduce process 1480.

The reduce process 1480 potentially receives events from multiple search peers and performs various results processing 1482 steps on the events. The results processing 1482 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 1482 can further include applying commands from the search query 1466 to the events. The query 1466 can include, for example, commands for evaluating and/or manipulating fields (e.g., to generate new fields from existing fields or parse fields that have more than one value). As another example, the query 1466 can include commands for calculating statistics over the events, such as counts of the occurrences of fields, or sums, averages, ranges, and so on, of field values. As another example, the query 1466 can include commands for generating statistical values for purposes of generating charts of graphs of the events.

Through results processing 1482, the reduce process 1480 produces the events found by processing the search query 1466, as well as some information about the events, which the search head 1462 outputs to the search and reporting app 1416 as search results 1468. The search and reporting app 1416 can generate visual interfaces for viewing the search results 1468. The search and reporting app 1416 can, for example, output visual interfaces for the network access application 1406 running on a computing device 1404 to generate.

The visual interfaces can include various visualizations of the search results 1468, such as tables, line or area charts, Choropleth maps, or single values. The search and reporting app 1416 can organize the visualizations into a dashboard, where the dashboard includes a panel for each visualization. A dashboard can thus include, for example, a panel listing the raw event data for the events in the search results 1468, a panel listing fields extracted at index time and/or found through field discovery along with statistics for those fields, and/or a timeline chart indicating how many events occurred at specific points in time (as indicated by the timestamps associated with each event). In various implementations, the search and reporting app 1416 can provide one or more default dashboards. Alternatively or additionally, the search and reporting app 1416 can include functionality that enables a user to configure custom dashboards.

The search and reporting app 1416 can also enable further investigation into the events in the search results. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 1466. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination or sub-combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In the Figures, bracketed text and blocks with dashed borders (e.g., large dashes, small dashes, dot-dash, and dots) may be used herein to illustrate optional aspects that add additional features to some examples. However, such notation should not be taken to mean that these are the only options or optional operations, and/or that blocks with solid borders are not optional in certain examples.

Reference numerals with suffix letters may be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

In the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

Additionally, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted in an open-ended manner to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method, comprising:
    obtaining, by an enterprise security application, a vulnerability report generated by a vulnerability scanner, wherein the vulnerability report is indicative of a detected vulnerability associated with a computing resource utilized within an information technology (IT) environment;
    identifying, by the enterprise security application via a security information and event management (SIEM) data store, one or more of asset data or activity data of the IT environment associated with the computing resource;
    causing display, by the enterprise security application, of a graphical user interface (GUI) indicative of a vulnerability and identifying the asset data or the activity data; and
    modifying a risk score associated with the vulnerability.

2. The computer-implemented method of claim 1, further comprising:
    identifying a type of the vulnerability scanner used to generate the vulnerability report; and
    normalizing data of the vulnerability report, based on the identified type, via use of a common data model.

3. The computer-implemented method of claim 1, wherein the obtaining the vulnerability report comprises:
    retrieving the vulnerability report from a third-party computing system, wherein the third-party is a developer or publisher of the vulnerability scanner; or
    receiving the vulnerability report from the vulnerability scanner.

4. The computer-implemented method of claim 1, further comprising:
    causing a user interface (UI) input element to be presented that allows a user to provide a temporal or environmental override value associated with the vulnerability or the computing resource; and
    receiving a user input providing the override value, wherein the modifying of the risk score is based at least in part on the override value.

5. The computer-implemented method of claim 4, wherein the modifying of the risk score is further based at least in part on a vulnerability score provided with the vulnerability report.

6. The computer-implemented method of claim 4, wherein the user input indicates that the override value is to be further used to modify risk scores associated with vulnerabilities of other computing resources.

7. The computer-implemented method of claim 1, wherein the modifying of the risk score occurs based at least in part on use of the asset data or the activity data.

8. The computer-implemented method of claim 1, wherein the identifying comprises identifying activity data associated with the computing resource, wherein the activity data comprises or is based on network traffic observed directed to the computing resource or originated by the computing resource.

9. The computer-implemented method of claim 1, further comprising:
   obtaining a second vulnerability report published by a third party indicative of a second vulnerability;
   determining, by the enterprise security application based on other asset data of the IT environment via the SIEM data store, that the second vulnerability is likely associated with one or more other computing resources of the IT environment; and
   causing display of a second GUI to present the second vulnerability and identify the one or more other computing resources of the IT environment.

10. The computer-implemented method of claim 1, further comprising:
    causing display of a UI input element allowing for user input that assigns the vulnerability to an other user or account to be investigated; and
    associating the vulnerability with the other user or account.

11. The computer-implemented method of claim 1, further comprising:
    prior to the modifying of the risk score, causing display of a dashboard GUI identifying a number of critically exploitable vulnerabilities associated with the IT environment; and
    after the modifying of the risk score, causing the display of the dashboard GUI to identify a different number of critically exploitable vulnerabilities associated with the IT environment.

12. A system comprising:
    a first one or more computing devices implementing a security information and event management (SIEM) system, the SIEM system including a SIEM data store including asset data and activity data, associated with an information technology (IT) environment, that was generated based on data gathered from within the IT environment; and
    a second one or more computing devices implementing an enterprise security application, the enterprise security application comprising instructions that, upon execution, cause the enterprise security application to:
        obtain a vulnerability report generated by a vulnerability scanner, wherein the vulnerability report is indicative of a detected vulnerability associated with a computing resource utilized within an information technology (IT) environment;
        identify, via use of the SIEM data store, one or more of asset data or activity data of the IT environment associated with the computing resource;
        cause display of a graphical user interface (GUI) indicative of the vulnerability and identifying the asset data or the activity data; and
        modify a risk score associated with the vulnerability.

13. The system of claim 12, wherein the enterprise security application further comprises instructions that, upon execution, cause the enterprise security application to:
    identify a type of the vulnerability scanner used to generate the vulnerability report; and
    normalize data of the vulnerability report, based on the identified type, via use of a common data model.

14. The system of claim 12, wherein the enterprise security application further comprises instructions that, upon execution, cause the enterprise security application to:
    cause a user interface (UI) input element to be presented that allows a user to provide a temporal or environmental override value associated with the vulnerability or the computing resource; and
    receive a user input providing the override value,
    wherein the modifying of the risk score is based at least in part on the override value.

15. The system of claim 12, wherein the modification of the risk score occurs based at least in part on use of the asset data or the activity data.

16. The system of claim 12, wherein the enterprise security application further comprises instructions that, upon execution, cause the enterprise security application to:
    prior to the modification of the risk score, cause display of a dashboard GUI identifying a number of critically exploitable vulnerabilities associated with the IT environment; and
    after the modification of the risk score, cause the display of the dashboard GUI to identify a different number of critically exploitable vulnerabilities associated with the IT environment.

17. A non-transitory, computer-readable medium having stored thereon instructions that, when executed by one or more processors of one or more computing devices, cause the one or more computing devices to implement an enterprise security application to perform operations including:
    obtaining a vulnerability report generated by a vulnerability scanner, wherein the vulnerability report is indicative of a detected vulnerability associated with a computing resource utilized within an information technology (IT) environment;
    identifying, via a security information and event management (SIEM) data store, one or more of asset data or activity data of the IT environment associated with the computing resource;
    causing display of a graphical user interface (GUI) indicative of the detected vulnerability and identifying the asset data or the activity data; and
    modifying a risk score associated with the vulnerability.

18. The non-transitory, computer-readable medium of claim 17, wherein the operations further comprise:
    identifying a type of the vulnerability scanner used to generate the vulnerability report; and
    normalizing data of the vulnerability report, based on the identified type, via use of a common data model.

19. The non-transitory, computer-readable medium of claim 17, wherein the obtaining the vulnerability report comprises:

retrieving the vulnerability report from a third-party computing system, wherein the third-party is a developer or publisher of the vulnerability scanner; or receiving the vulnerability report from the vulnerability scanner.

20. The non-transitory, computer-readable medium of claim 17, wherein the operations further comprise:

causing a user interface (UI) input element to be presented that allows a user to provide a temporal or environmental override value associated with the vulnerability or the computing resource; and receiving a user input providing the override value, wherein the modifying of the risk score is based at least in part on the override value.

* * * * *